United States Patent
Pfister et al.

(10) Patent No.: US 12,552,092 B2
(45) Date of Patent: Feb. 17, 2026

(54) SELECTIVE SINTERING OF POLYMER-BASED COMPOSITE MATERIALS

(71) Applicant: EOS GmbH Electro Optical Systems, Krailling (DE)

(72) Inventors: Andreas Pfister, Fuerth (DE); Sybille Fischer, Eichenau (DE); Verena Galitz, Krailling (DE)

(73) Assignee: EOS GmbH Electro Optical Systems, Krailling (DE)

( * ) Notice: Subject to any disclaimer, the term of this patent is extended or adjusted under 35 U.S.C. 154(b) by 526 days.

(21) Appl. No.: 17/597,708

(22) PCT Filed: Aug. 7, 2020

(86) PCT No.: PCT/EP2020/072288
§ 371 (c)(1),
(2) Date: Jan. 19, 2022

(87) PCT Pub. No.: WO2021/032511
PCT Pub. Date: Feb. 25, 2021

(65) Prior Publication Data
US 2022/0281163 A1    Sep. 8, 2022

(30) Foreign Application Priority Data
Aug. 16, 2019 (DE) .......................... 102019212298.1

(51) Int. Cl.
*B29C 64/153* (2017.01)
*B33Y 10/00* (2015.01)
(Continued)

(52) U.S. Cl.
CPC ............ *B29C 64/153* (2017.08); *B33Y 10/00* (2014.12); *B33Y 70/10* (2020.01); *B29K 2071/00* (2013.01);
(Continued)

(58) Field of Classification Search
CPC .............. B29C 64/153; B29K 2071/00; B29K 2077/00; B29K 2105/0026; B29K 2105/251; B29K 2307/04; B29K 2309/02
See application file for complete search history.

(56) References Cited

U.S. PATENT DOCUMENTS

2007/0232753 A1    10/2007    Monsheimer et al.
2007/0267766 A1*   11/2007    Hesse ................... B29B 13/007
                                                              264/6
(Continued)

FOREIGN PATENT DOCUMENTS

CN    109575323 A    4/2019
DE    4410046        5/1995
(Continued)

OTHER PUBLICATIONS

DIN EN ISO 11357-1, Feb. 2017, 42 pages.
(Continued)

*Primary Examiner* — JaMel M Nelson
*Assistant Examiner* — Erica Hartsell Funk
(74) *Attorney, Agent, or Firm* — Polsinelli PC

(57) ABSTRACT

Powder mixture for the use as building material in additive manufacturing processes, wherein the powder mixture includes a first powder having powder particles of a first thermoplastic polymer material, and a reinforcement material that is at least partially embedded in the powder particles of the first powder and/or adhered to the surface of the powder particles of the first powder. The second powder includes powder particles of a second thermoplastic polymer material which is the same as or different from the first thermoplastic polymer material. The powder particles of the second powder do not include the reinforcement material or include it only in an amount of at most 50% by weight
(Continued)

relative to the amount of the reinforcement material in or on the powder particles of the first powder.

11 Claims, 8 Drawing Sheets

(51) Int. Cl.
| | | |
|---|---|---|
| *B33Y 70/10* | (2020.01) | |
| *B29K 71/00* | (2006.01) | |
| *B29K 77/00* | (2006.01) | |
| *B29K 105/00* | (2006.01) | |
| *B29K 307/04* | (2006.01) | |
| *B29K 309/02* | (2006.01) | |

(52) U.S. Cl.
CPC .. *B29K 2077/00* (2013.01); *B29K 2105/0026* (2013.01); *B29K 2105/251* (2013.01); *B29K 2307/04* (2013.01); *B29K 2309/02* (2013.01)

(56) References Cited

U.S. PATENT DOCUMENTS

| | | |
|---|---|---|
| 2009/0072424 A1 | 3/2009 | Herve et al. |
| 2014/0329953 A1 | 11/2014 | Paternoster |
| 2020/0047410 A1 | 2/2020 | Achten et al. |
| 2021/0129383 A1 | 5/2021 | Pfister et al. |

FOREIGN PATENT DOCUMENTS

| | | | |
|---|---|---|---|
| DE | 102004009234 | 9/2005 | |
| DE | 102008024281 | 12/2009 | |
| DE | 102008024288 | 12/2009 | |
| EP | 1660566 | 5/2006 | |
| EP | 1797141 | 6/2007 | |
| EP | 1840155 | 10/2007 | |
| EP | 2368696 | 9/2011 | |
| EP | 3395901 | 10/2018 | |
| EP | 3395901 A1 * | 10/2018 | ........... B29C 64/153 |
| EP | 3560685 | 10/2019 | |
| EP | 3878910 A1 | 9/2021 | |
| WO | 2005090448 | 9/2005 | |
| WO | 2014088762 | 6/2014 | |
| WO | 2019206921 | 10/2019 | |

OTHER PUBLICATIONS

DIN EN ISO 1133-1, Mar. 2012, 33 pages.
ISO 291, 2008, 2 pages.
ISO 13322-2, Nov. 1, 2006, 31 pages.
Chinese Application No. 202080057868.9, Office Action dated Mar. 1, 2024.

* cited by examiner

Fig. 10

Configuration of the CAMSIZER XT Software

CAMSIZER XT:0301

| Overlap areas: | x area: | 0.080 mm to | 0.160 mm |
| | xc min: | 0.080 mm to | 0.160 mm |
| | xFe min: | 0.080 mm to | 0.160 mm |
| | xFe max: | 0.080 mm to | 0.160 mm |
| | x area: | 0.100 mm to | 0.160 mm |
| | xc min: | 0.100 mm to | 0.160 mm |
| | xFe min: | 0.100 mm to | 0.160 mm |
| | xFe max: | 0.100 mm to | 0.160 mm |
| | x area: | 0.100 mm to | 0.160 mm |
| | xc min: | 0.100 mm to | 0.160 mm |
| | xFe min: | 0.100 mm to | 0.160 mm |
| | xFe max: | 0.100 mm to | 0.160 mm |

☐ fixed ratio between the cameras for calculation
☑ switch off light source

| | CCD-basic | CCD-zoom |
|---|---|---|
| imaging scale: | 72.2359 pixel/mm | 633.1597 pixel/mm |
| vertical distance to the groove: | 37.0000 mm | 35.0000 mm |
| centre of the calibration area: | 72.2359 pixel/mm | 633.1597 pixel/mm |

| | |
|---|---|
| max. file number for average: | 50 |
| max. file number for adjustment: | 10 |
| ☑ edit comments | |
| ☐ transfer parameter from 2nd measurement task | |
| ☐ transfer parameter from 2nd measurement task | |
| ☐ create Q0 and Q2 adjustment files | |
| ☑ test boundaries | |
| ☑ multiple x definitions | |
| ☑ calculate Mv(x), Sigma(x) | |
| ☐ calculate p2, Q2, q2 | |
| ☐ calculate p2_Sv | |
| ☐ calculate class-dependent Q(threshold) | |
| ☑ enable automatic image saving | |
| ☐ calculate relative density rD | |
| ☐ enable balance for rD | |
| ☐ calculate distribution of line segments | |
| minimal groove control value | 0 |
| ☐ external control via COM port | |
| ☐ enable automatic trend analysis | |
| accuracy in table, positions: | 2 |
| ☑ zoom of diagram in Y direction | |
| ☑ set Q3 size boundaries | |
| ☐ set Q0 size boundaries | |
| ☐ set Q2 size boundaries | |
| ☐ calculate AFS number | |
| ☐ calculate CV, MA | |
| ☐ calculate SGN, UI | |
| ☐ calculate PI | |
| ☐ calculate beta for RRSB | |

| | |
|---|---|
| ☐ calculate parameters for break | |
| ☐ calculate Q(V) | |
| ☐ calculate Q3_MVH | |
| ☐ search xmax(q3), xmax(q0) | |
| ☐ enable automatic funnel setting | |
| ☐ enable up-positioning of funnel | |
| ☐ update background during measurement | |
| Interval [s]: | 0 |
| ☐ deposed groove | |
| deviation [mm] | 10.0 |
| ☑ set boundaries of parameters of shape | |
| ☑ set maximum area density | |
| ☐ test alignment and segregation | |
| ☐ evaluation of partial image | |
| number directions for shape parameters: | 32 |
| smoothening factor for xFe, xMa, xc: | 1 |
| smoothening factor for Q(xc min), Q(xFe_min), Q(xFe_max): | 1.8000 |
| ☑ adjust SPHT | |
| ☑ weighting of shape data of CCD-zoom as for CCD-basic | |
| ☑ ellipsoid model for Q(xc min), Q(xFe_min), Q(xFe_max): | l, b, b |
| ☐ make concave particles convex | |
| max. number of search steps: | 0 |
| search repeats: | 0 |
| particle shape settings: select in measurement task | |
| ☐ xFe, xMa, xc correction | |
| ☐ xFe, xMa, xc correction (sphere) | |
| ☐ correction of b/l, B/L... (sphere) | |

Fig. 11

Configuration of the CAMSIZER XT Software

CAMSIZER XT:0301

- ☐ presentation mode
- ☐ with brightness correction
- ☐ binary images
- ☐ with contour
- ☑ CAMSIZER XT image presentation

- ☑ combined parameters
- ☑ ignore blurred particles
- ☑ copy and export of files in UNICODE
- ☑ combine sieving and CAMSIZER XT measurement
- ☑ automatic brightness test
- ☑ enable automatic copy of measurement task
- ☑ enable calibration in measurement mode
- ☐ enable creation and evaluation of binary files
- ☑ enable measurement of series
- ☐ enable calculation of the average particle size DM-CECA and TG security software
- ☐ enable overwriting of files in the administrator mode
- ☐ log out WINDOWS after program exit boundary error correction: elliptic, Q(x) and shape
- ☐ calculate q(x) without smoothening
- ☐ enable particle count
- ☐ measurement without CCD-basic
- ☐ measurement without CCD-zoom
- ☑ calculate class-dependent average values of the shape parameters
- ☑ correction of blurred edges
- ☑ extended XLD and XLE export files
- ☐ enable editing of sample mass
- ☐ calculate Ul_gkl(Q1,Q2)

configure adjustment
- ☑ Q3(x) adjustment
- ☐ Q0(x) adjustment
- ☐ Q2(x) adjustment
- ☑ one sieve class
- ☐ one sieve class using the symmetric Weibull distribution
- ☐ one sieve class using the Weibull distribution
- ☑ one sieve class and entire distribution
- ☑ entire distribution, using the symmetric Weibull distribution Date format: automatic
- ☐ display guide plate and groove width at first measurement start after software start maximum class number: 300
- ☐ edit comments in measurement mode

- ☑ higher accuracy of x values
- ☐ calculate Mv(x) values
- ☐ calculate roundness
- ☐ configure roundness in parameter mode settings for roundness
- ☑ use xc_min
- ☐ use x_inner

| | |
|---|---|
| sub for RDNS_C | 0.1744 |
| div for RDNS_C | 0.6718 |
| sub for SPHT_K | 0.2892 |
| div for SPHT_K | 0.6714 | time between lowered pressure and dispergation [ms]: 800

Fig. 12

| Cameras (measurement parameters) | |
|---|---:|
| ☑ CCD-basic: | |
| threshold | |
| for particle sizes | |
| smaller than [mm]: | 0.0023 |
| larger than [mm] | 20 |
| for shape parameters | |
| smaller than [mm]: | 0.0023 |
| larger than [mm] | 20 |
| | |
| ☑ CCD-zoom: | |
| threshold | |
| for particle sizes | |
| smaller than [mm]: | 0.0023 |
| larger than [mm] | 2 |
| for shape parameters | |
| smaller than [mm]: | 0.0023 |
| larger than [mm] | 2 |

| | |
|---|---:|
| frame rate: | 100% (1:1) |
| ☑ alert if frame rate < | 0.95 |
| interval of display: | 80 |
| ☑ fill transparent particles | |

SELECTIVE SINTERING OF POLYMER-BASED COMPOSITE MATERIALS

TECHNICAL FIELD OF THE INVENTION

The present invention is related to a powder mixture for the use as building material for manufacturing a three-dimensional object by solidifying the building material layer by layer at the positions corresponding to the cross-section of the three-dimensional object in the respective layer, in particular by exposure to radiation. Furthermore, it is an object of the present invention to provide a method for preparing the powder mixture according to the invention, a three-dimensional object manufactured from the powder mixture according to the invention, in particular by selective sintering by means of electromagnetic radiation, and the use of the powder mixture according to the invention for manufacturing said three-dimensional object.

BACKGROUND OF THE INVENTION

As is known, e.g., from DE 44 10 046, a method for manufacturing a three-dimensional object may be carried out in a layer-by-layer manner by selective sintering by means of electromagnetic radiation with the aid of an electromagnetic radiation source. In such a process, a three-dimensional object is manufactured layer by layer—according to the principle of "additive manufacturing"—by applying powder layers and joining these layers together by selectively solidifying the powder at the positions corresponding to the cross-sections of the object.

FIG. 1 shows an example of a laser sintering device which may be used for manufacturing a three-dimensional object in a layer-by-layer manner. As can be seen from FIG. 1, the device comprises a container 1. The latter is open at the top and is bordered at the bottom by a support 4 for carrying an object 3 to be formed. A working plane 6 is defined by the upper edge 2 of the container (or its side walls, respectively). The object is located on the upper side of the support 4 and is formed of a plurality of layers extending parallel to the upper side of the support 4 and made of a pulverulent building material which can be solidified by means of electromagnetic radiation. The support can be moved in the vertical direction, i.e. parallel to the side wall of the container 1, by means of a height adjustment device. This may be used to adjust the position of the support 4 relative to the working plane 6.

Above the container 1 and the working plane 6, respectively, an application device 10 is provided for applying the powder material 11 to be solidified to the support surface 5 or a last solidified layer. Furthermore, an irradiation device in the form of a laser 7 is arranged above the working plane 6, which emits a directed light beam 8. This is deflected by a deflector 9, for example a pivoting mirror, as a deflected beam 8' in the direction of the working plane 6. A control unit 40 enables the control of the carrier 4, the application device 10 and the deflection device 9. The elements 1 to 6, 10 and 11 are arranged within the machine frame 100.

When manufacturing the three-dimensional object 3, the powder material 11 is applied layer-by-layer to the support 4 or a previously solidified layer and solidified by the laser beam 8' at the positions of each powder layer corresponding to the object. After each selective solidification of a layer, the support is lowered by the thickness of the next powder layer to be applied.

Compared to the system described above, there are many modifications of methods and devices for manufacturing a three-dimensional object by selective sintering using electromagnetic radiation that can also be used. For example, instead of a laser and/or a light beam, other systems could be used to selectively deliver electromagnetic radiation, such as mask exposure systems, VCSEL exposure system with line exposure (e.g. P9), HP exposure system with absorber ink and surface heating or the like.

The building material is often a powder with powder particles comprising a thermoplastic polymer material. The mechanical properties of the manufactured object can be influenced by suitable choice of polymer in the raw material. For example, polymers that result in preferred mechanical material properties in the final object are described in DE 10 2008 024 281 A1 and DE 10 2008 024 288 A1, the contents of which are deemed to be incorporated for the purpose of selecting suitable polymers in an embodiment of the invention. Likewise, it has been described that the mechanical properties could be further improved by using fillers. For example, carbon fibres, glass fibres, Kevlar fibres, carbon nanotubes, or fillers that have a low aspect ratio (glass beads, aluminium grit, etc.) or mineral fillers such as titanium oxide could be incorporated into the polymer or copolymer containing powder.

A major disadvantage of the known sintering processes working according to the principle of additive manufacturing is the comparatively high crystallisation tendency of the thermoplastic polymer materials. The crystallinity is typically much greater than in objects manufactured by conventional polymer processing technologies such as injection moulding. That is, in a process for manufacturing a three-dimensional object from powder by selective sintering using electromagnetic irradiation of the polymer-containing powder, e.g., an embodiment such as that shown in FIG. 1, the crystallinity of the manufactured object tends to be high.

Especially in the layer-by-layer building process, a high powder bed temperature, which is about 1-50° C., preferably 1-30° C., more preferably 1-20° C. and especially 1-10° C. below the melting point $T_m$ of the polymer, is usually used. Alternatively, however, it may be built at temperatures below the crystallisation temperature and above the glass transition temperature to produce a low level of crystallinity in the component, wherein support structures may be employed to avoid warpage effects. Typically, the object is exposed to relatively high process temperatures for a significant period of time and usually undergoes very long cooling times in addition. A significant problem is the so-called curling, as this may occur so severely during the process that the entire building process has to be stopped immediately because massive component displacement and destruction of the powder bed may occur during the next recoating process. To prevent or minimise curling of the object during the building process, the process temperature should be kept close to the melting point of the polymer contained in the powder to ensure a good bond between the subsequent layers and minimise the formation of pores due to insufficient melting of the powder particles. Consequently, the temperature of the powder bed is usually maintained at least at, preferably above, the crystallisation temperature Tk of the polymer throughout the building process. The formed object itself may be exposed to temperatures above Tk for a long period of time. At the end of the building process, when all heating sources of the sintering machine are switched off, cooling above Tk of the object starts due to natural heat loss to the environment. This may take hours to days due to the low thermal conductivity of the polymer powder and the large powder bed depending on the polymer powder used and the process conditions, i.e. without specifying a suitable cooling rate, which may increase the crystallinity of the polymer object during the cooling process.

The process window with a preheating temperature of the process chamber at which it is still possible to build in a process-safe manner is defined as the difference between the highest possible building temperature ("melting temperature") at which the powder bed just does not begin to melt, and the lowest possible building temperature; at which curl may just be prevented. An increased tendency to crystallise leads to increased curl of the built component after irradiation. As a result, the probability increases that a component will be torn out of the powder bed by the subsequent recoating process. The lower component temperature is therefore defined by the process chamber temperature at which no components are torn out by the recoating process ("non-curl temperature", abbreviation NCT).

SUMMARY OF THE INVENTION

Therefore, it is an objective of the present invention to provide means and measures in order to manufacture three-dimensional objects with desired properties, such as good mechanical properties, in particular taking into account per se opposing physicochemical parameters of polymer powders, in particular by means of selective sintering processes but also by means of other processes of additive manufacturing, by means of electromagnetic radiation, heat, bonding or the like, wherein especially and in particular in the case of sintering processes, a safe and low-risk mode of operation, in particular with regard to the curling behaviour, shall be enabled.

This objective is solved by a powder mixture process by a three-dimensional object. Further developments of the invention are defined herein.

In the course of their research, the inventors found out that the already comparatively high crystallisation tendency of thermoplastic polymer materials increased so much by adding a reinforcement material that the crystallisation temperature in the sintering process increased considerably. The inventors attribute this to the fact that a reinforcement material, such as those used for composite materials (composites), can act as a nucleating agent in thermoplastic polymer materials. Although it was possible to counteract the increased tendency to crystallise by increasing the preheating temperature of the process chamber (lower building temperature), however, this solution was only satisfactory to a limited extent considering the following observations.

A higher preheating temperature is already disadvantageous from an energetic point of view. Furthermore, it may lead to a stronger ageing (increase of viscosity due to, e.g., cross-linking or chain build-up or degradation due to, e.g., thermo-oxidative degradation and thus viscosity reduction) of the non-sintered powder. As a result, the refreshment rate of the powder may deteriorate (e.g. due to cross-linking) or the mechanical component properties may be reduced (e.g. due to degradation). In addition, a result is a smaller process window, which is undesirable and detrimental to process reliability. Due to the smaller process window, higher demands are placed on process control and the risk increases that the process runs outside the process window. If the process falls below the lower building temperature, the increased tendency to crystallise may lead to increased curl of the built object after irradiation. This increases the likelihood of a component being pulled out of the powder bed by the subsequent recoating process.

It was observed that by using the mixture of a first and second powder according to the invention, compared to using only one type of powder with filler (i.e. the filler is distributed throughout the powder supplied to the building process as is conventionally normal), the tendency to curl was reduced, and further the tendency to crystallise was reduced, resulting in less component warpage during the building process and also during the cooling process. By using the powder mixture according to the invention, it was also possible to avoid the disadvantage of conventional filler-filled polymer powders, in which the components obtained were worse in terms of dimensional stability and accuracy than in the case of using unfilled polymer powders.

For example, the inventors observed that in certain cases, such as a carbon fibre reinforced PEKK powder (PEKK-CF), the non-curl temperature may even be higher than the upper building temperature. In DSC analytical investigations, it was found that PEKK has a significantly increased tendency to crystallise and a significant increase in the enthalpy of crystallisation compared to unreinforced PEKK. As a result, it was not possible to reliably process the fibre-reinforced powder in the laser sintering process in the case of some PEKK-CF powders.

Furthermore, correlations were observed which, if certain powder characteristics and their values are taken into account, help to solve the problem when, as here, a mixture of powders is involved whose different powder components (first and second powder) differ as a result of the inclusion of filler in mainly one powder (first powder): In principle, the powder characteristics of bulk density and specific surface area, which is expressed, for example, by the specific BET surface area, are independent of powder sizes as defined, for example, by a certain averaged mean size or by a certain particle size distribution. This means, vice versa, that it is in principle not possible to derive the parameters of bulk density and/or specific surface area (BET surface area) from a certain averaged mean size or a certain particle size distribution. The effects and behaviour of the powder are different depending on the bulk density and specific BET surface area on the one hand and mean size or particle size distribution on the other. According to the invention, it has now been recognised as important that—in principle independent of mean size or particle size distribution—the values for the bulk density and preferably also for the specific surface area (BET surface area) for the entire mixed powder lie in respective specific ranges; it is not sufficient to consider these parameters for each type of powder separately, at least not without taking into account the relationship with the respective final values for the mixture. These parameters and the associated effects are in fact influenced differently as a result of the introduction of filler into mainly one type of powder (in this case the first powder) and possibly the associated further differentiating aspects and can under certain circumstances vary greatly in the result. Specifically, it has been observed in this context that, especially in the case of the total mixture of the first and second powders as described above, care should be taken to ensure that, overall and uniformly, the bulk density is in the range of 0.35 to 0.70 g/cm$^3$ and that, preferably, in addition, the specific surface area defined by means of the BET method is below 10 m$^2$/g. Powders composed of particles with a columnar or fibrous particle shape, or powders with a relatively high proportion of fine particles, or powder mixtures containing such powder components, for example tend to have relatively low bulk density values overall. Similar behaviour can also be expected for ground powders if care is not taken to specifically maintain the resulting bulk density and the resulting BET surface area. Grinding a polymer, especially in the case of multiple grinding processes, can in fact easily result in corresponding fine components in the powder. Already existing columnar or fibrous powders or fibrous particles formed by the grinding of polymers can lead to further fine components in (possibly further) grinding processes and thus to relatively low values of the bulk density. The formation of fine components and/or fibrous particles may also depend on the type of powder polymer being processed, and is for example favoured in the case of tough or brittle polymers or polyblends. On the other hand, a high bulk density of more than 70 g/cm$^3$ is unfavourable in terms of the mass of unsintered used powder and thus in terms of economic efficiency. If relatively more unsintered used powder is then obtained at the end of the building process, the used powder scrap is high for powders that age strongly and where there is thus poor refreshment, which causes a higher mass and thus higher costs. More used powder is produced than is needed for the refreshment. This is especially true for powders that require a refreshment rate of >20-30% virgin powder.

However, if the range of bulk density for the total powder according to the invention is complied with, the component porosity obtained is low while at the same time the economic performance is good, the overall mechanical properties of the component are good, and the components obtained can meet dimensional accuracy and dimensional stability. Surprisingly, the mentioned values for bulk density and specific BET surface area each individually lead to these common beneficial effects. The effect is significantly increased if both parameter values are fulfilled in combination. In addition, further specific effects can be achieved through the respective parameters, such as improved refreshability and/or a larger process window (through, e.g., a reduced lower possible building temperature, the non-curl temperature=NCT) due to better thermal conductivity through the restricted and low BET surface. In the combined consideration of both parameter ranges, the improvement of the refreshment factor due to the restricted and low BET surface area thus compensates for the problem of a potentially high mass of used powder, which can otherwise result from high values of bulk density.

Surprisingly, requirements that are in themselves contradictory could thus be fulfilled by the powder mixture according to the invention and the underlying problem could be solved.

Accordingly, an object of the present invention is a powder mixture, wherein the powder mixture comprises a first powder and a second powder. The first powder contains powder particles comprising a first thermoplastic polymer material and a reinforcement material. The second powder contains powder particles comprising a second thermoplastic polymeric material but not containing the reinforcement material contained in the first powder, or substantially not containing the reinforcement material contained in the first powder or containing up to a maximum of 50% by weight of the reinforcement material contained in the first powder. In addition, care is to be taken to ensure that the mixed powder (i.e. the mixture of the first powder and the second powder) has a bulk density of 0.35 to 0.70 g/cm$^3$. Preferably, the mixed powder further has a BET surface area of <10 m$^2$/g. The above common effects are further enhanced if the bulk density is at least 0.4 or at least 0.42 or at least 0.48 or at least 0.50 or at least 0.54 g/cm$^3$, and/or at most 0.65 or at most 0.60 g/cm$^3$, more preferably at least 0.45 and in particular at least 0.5 g/cm$^3$ and/or at most 0.60 g/cm$^3$, and if preferably the BET is <5 m$^2$/g, more preferably <3 m$^2$/g and in particular <1 m$^2$/g.

The advantages of the invention are at least partially also achieved if the amount of the reinforcement material in the powder particles of the second powder is significantly lower than the amount of the reinforcement in the powder particles of the first powder. Therefore, it is also possible within the scope of the invention that the powder particles of the second powder contain the reinforcing material contained in the powder particles of the first powder only in an amount of at most 50, preferably at most 40, at most 30, at most 25 and in particular at most 20, at most 15, at most 10 or at most 5% by weight relative to the amount of the reinforcement material in the powder particles of the first powder. Instead of one reinforcement material, the powder particles of the first powder may also comprise more than one reinforcement material.

In one embodiment of the invention, if the powder particles of the first powder contain more than one reinforcement material, it is preferred that the powder particles of the second powder do not contain any of the reinforcement materials contained in the first powder.

Preferably, the powder particles of the second powder do not contain any reinforcement material(s). In a further embodiment, the second powder (considered as a whole) does not contain any reinforcement material(s). For ease of reading, in the present application and in particular hereinafter, the term reinforcement material is predominantly used in the singular and, unless otherwise indicated or apparent from the context, is intended to be understood as applying to both one reinforcement material and more than one reinforcement material.

In a preferred embodiment, the reinforcement material is substantially fully embedded or incorporated within the grain of the powder particles of the first powder. In this way, the advantages of the present invention are best achieved. This means that the reinforcement material is substantially completely enclosed by the powder particle, in particular substantially enclosed by a polymer matrix, as is also shown, for example, in patent application EP 1 660 566. The term "substantially" in this context means that the surface of at least 50, preferably at least 60, at least 70 or at least 80 or in particular even at least 90 percent by volume of the powder particles of the first powder is free from the reinforcement material (being visible on the surface or detectable by suitable optical or other analytical methods), and more preferably have no partially or completely exposed reinforcement material. Alternatively or additionally, the reinforcement material may adhere to the surface of the powder particles of the first powder. In order to embed or incorporate the reinforcement material into the first powder, the first powder is preferably manufactured by melt compounding followed by grinding, preferably cryogenic grinding, by melt compounding followed by simultaneous or subsequent melt spinning and microgranulation or cutting of the fibre strand, by melt dispersing, by melt spraying or by precipitation from solvents.

Melt dispersion of polymer may be done with, for example, water soluble dispersing polymer such as polyethylene glycol and polyvinyl alcohol. By washing out the dispersing polymer with a suitable solvent such as water, substantially spherical particles are obtained. For further details, it is referred to European patent application 1 840 155. Another possibility is melt dispersion of the polymer with a suitable block copolymer. In this case, essentially spherical particles of the polymer are obtained by dissolving out the block copolymer. For further details, reference is made to European patent application 1 797 141.

In addition to the function actually intended, the reinforcement material may have the inherently problematic property of raising the crystallisation temperature of the thermoplastic material, for example by at least 2° C. or even by at least 5° C. This is counteracted by the present invention.

In a further aspect of the present invention directed to a particular process adapted to compounding reinforcement material into the first powder, said process includes the steps according to which the polymeric material is melted and the at least one reinforcement material is compounded/embedded into the melt, then either still during this step of compounding or after compounding, the melt containing the reinforcement material is spun, the resulting spun fibres are optionally or even preferably stretched, and then the fibres containing the reinforcement material are granulated or chopped. Optionally, the thus granulated or chopped reinforcement material containing powder may be subjected to a rounding treatment in a further step to obtain an improved particle size distribution specified in more detail below. A particularly suitable rounding treatment is the thermomechanical treatment of the powder described in PCT/EP2019/060398.

The invention also relates to a polymer powder containing reinforcement material obtained by this process particularly adapted thereto.

As polymer material for this particular adapted process, thermoplastic polymer described in more detail below is suitable. This particular process described above may be advantageously used when reinforcement material is compounded into a powder whose main polymer component is a polyaryletherketone (PAEK), in particular one selected from the group consisting of polyetheretherketone (PEEK), polyetherketoneketone (PEKK), polyetherketone (PEK), polyetheretherketoneketone (PEEKK), polyetherketoneetherketoneketone (PEKEKK), polyetheretheretherketone (PEEEK), polyetheretherketone-polyether diphenyl ether ketone (PEEK-PEDEK) and copolymers including at least one of the aforementioned polymers, especially when the powder polymer comprises or consists of PEKK.

Compared to a corresponding powder mixture without reinforcement material or compared to a first powder without reinforcement material, the mixture of first and second powder may have a crystallisation temperature lowered by at least 1° C., preferably by at least 2° C., more preferably by at least 5° C. and in particular by at least 10° C., and/or a crystallisation enthalpy lowered by at least 1 J/g, preferably by at least 2 J/g, more preferably by at least 5 J/g and in particular by at least 10 J/g, in each case determined by DSC (determined in accordance with DIN EN ISO 11357 at 20° C./min cooling rate).

The reinforcement material is preferably uniformly distributed over the powder particles—and there as described preferably substantially within the grain—of the first powder. Further preferably, the reinforcement material is contained in at least 75%, preferably at least 80%, more preferably at least 85%, in particular at least 90% or even 95% of the powder particles of the first powder. Ideally, substantially each powder particle of the first powder contains the reinforcement material. In the obtained product, the three-dimensional component, a non-constant distribution of the reinforcement material may result from the fact that no or only limited reinforcement material is contained in the second powder, as described in more detail below.

Herein, a reinforcement material is referred to as a substance which already has a reinforcing effect per se due to its product properties or which leads to a higher modulus of elasticity and/or a higher ultimate tensile strength and/or a lower elongation at break in the three-dimensional object due to its mechanical reinforcing effect, optionally due to the concentration present in the powder mixture when the powder mixture is used as a building material for manufacturing a three-dimensional object as described here, wherein the respectively mentioned change is preferably at least 5%, more preferably at least 10% and in particular at least 15%, in each case in comparison with a corresponding powder mixture which is free of this reinforcement material and a three-dimensional object manufactured therefrom in an identical manner.

In a preferred embodiment, the reinforcement material is substantially particulate, platelet-shaped and/or fibrous. Due to the tendency of such formed materials to act as nucleating agents, the invention may be particularly well utilised in this case.

The reinforcement material is preferably a material that already has a reinforcing effect due to its product properties, in particular selected from the group consisting of carbon fibres, glass fibres, Kevlar fibres, carbon nanotubes, or reinforcement materials that have a low aspect ratio such as glass spheres, aluminium grit and the like. Other reinforcement materials are particulate and in particular spherical fillers or irregularly shaped fillers having a low aspect ratio, preferably inorganic and mineral fillers. Preferred fillers are described elsewhere. Flame retardants may also have a reinforcing effect as described herein, particularly when present in a concentration of 20 to 60% by weight. Preferred flame retardants are described elsewhere.

In a further preferred embodiment, the reinforcement material contains fibres or is formed exclusively by fibres. Suitable fibre diameters are between 1 and 50 µm, preferably at least 2 and/or at most 20 µm, more preferably at least 3 and/or at most 10 µm and in particular at least 5 and/or at most 7 µm. However, the fibre diameter may also lie outside the aforementioned ranges without departing from the particular advantages of the present invention. Preferred fibres are carbon fibres, organic fibres, in particular aramid fibres, inorganic fibres, in particular glass fibres, boron fibres, asbestos fibres and/or wollastonite fibres. Different types of fibres can be combined with each other.

In addition or as an alternative to fibres, the reinforcement material may contain nanotubes, especially carbon nanotubes. Carbon nanotubes (CNT) are microscopic tubular structures (molecular nanotubes) of carbon. In addition or alternatively to fibres and/or nanotubes, the reinforcement material may comprise graphite nanoplatelets and/or fullerenes and/or platelet-shaped reinforcement materials such as phyllosilicates (e.g. aluminium silicates) or whiskers.

In particular, the powder mixture according to the invention is to be used as a building material in the method according to the invention described herein for manufacturing a three-dimensional object. In addition to laser sintering, the powder mixture according to the invention is also particularly suitable for binder jetting and high speed sintering processes (HSS), such as the Multi Jet Fusion process and other powder bed-based melting processes, in which areas of the powder bed can be selectively melted with infrared heaters, essentially by applying inks or absorbers for activation and/or inhibition.

The advantages and embodiments of the invention are further illustrated below.

In the three-dimensional objects manufactured therefrom, the powder mixture according to the invention leads to a noticeable improvement of certain very advantageous mechanical properties, which include high stiffness, high compressive strength, high impact strength, high ultimate tensile strength, flexural strength, high elongation at break and/or high heat distortion resistance and combine them in a balanced manner—despite opposing effects—but without being limited to them, while on the other hand further opposing properties such as low curling behaviour are nevertheless well balanced. Surprisingly, according to the invention, a balanced combination of intrinsically partly opposing properties of the obtained three-dimensional object as well as of process-related conditions during its manufacturing is achievable, as is not possible in comparison (with otherwise identical materials and conditions) with a use of "pure" powder or of powder in which the reinforcement material is added to the entire powder, e.g. as a dry blend. For example, the overall properties and process conditions when using the combination of first powder and second powder according to the invention are significantly better than with a corresponding powder that does not contain any portions of unreinforced powder ("pure composite") or with completely unreinforced powder or also compared to a mere dry blend of unreinforced powder and reinforcement material.

Thus, the powder mixture according to the invention surprisingly leads to a lowering of the lower building temperature and an enlargement of the process window compared to a powder that does not contain any portions of unreinforced powder. The process window is defined by the difference between the highest possible building temperature and the lowest possible building temperature in a predefined process for manufacturing a three-dimensional object by solidifying a pulverulent building material layer by layer at the positions corresponding to the cross-section of the three-dimensional object in the respective layer by exposure to radiation. Preferably, the lowest possible building temperature of the powder mixture, compared to a lowest possible building temperature of the first powder alone, which contains the reinforcement material, determined in a reference measurement, is reduced by 1° C., more preferably 2° C., more preferably 3° C., more preferably 4° C., more preferably 5° C., more preferably 6° C., more preferably 7° C., more preferably 8° C., more preferably 9° C. and more preferably 10° C. In embodiments in which the highest possible building temperature (UBT="upper building temperature") is maintained (e.g. polyamide, in particular PA11), the process window is extended or enlarged by the corresponding temperature amount. In other embodiments, the highest possible building temperature (UBT) is also lowered, but not to the same extent as the non-curl temperature. As a result, it may be possible to build at a process chamber temperature that provides components with good dimensional stability and good mechanical properties. Surprisingly, an ultimate tensile strength (UTS) may be achieved that exceeds the tensile strength of the 3D object formed from "pure" composite powder as the building material. Furthermore, the process is safer and in particular the curling risk is lower.

The reduction of the non-curl temperature may be determined directly by means of a process test. For this purpose, three-dimensional crosses are homogeneously distributed within the xy building plane (cf. FIG. 2). The building temperature in the additive manufacturing machine is initially set to approx. 10° C. below the expected non-curl temperature and the number of crosses that still exhibit a strong curl at this building temperature is noted. The building temperature is successively increased until no cross shows process-critical curl behaviour and all crosses can be built in a reliable process. The process parameters are preferably kept constant for the different powder mixtures; for laser sintering on EOS machines, for example, this may be defined in the default.job of the system software PSW or EOSPrint, for example with regard to heating parameters, irradiation parameters and recoating parameters.

Fibre-reinforced composite powders, in which the reinforcement material is present in the powder grain through embedding or incorporation by the manufacturing process for the first powder have the advantage that there is a significantly reduced direction predominance of the fibres in the recoating direction during the recoating process. This results in components with significantly more isotropic component properties (especially with regard to the modulus of elasticity) in the xyz direction than would be the case with a dry blend of fibre and thermoplastic powder. However, the disadvantage of "pure" fibre-in-grain composites is that the melt viscosity and surface tension of the powder grain are significantly higher, resulting in a qualitatively poorer and rougher melt film when melted by the irradiation unit.

The powder mixture according to the invention is further surprisingly characterised by the fact that an object may be manufactured therefrom which has isotropic component properties and yet a good refreshment factor. This advantage is achieved by dry mixing the first powder and the second powder. Dry mixing results in improved solidification and fewer sink marks due to a smoother melt film. In addition, improved refreshability is achieved as building may be performed at a lower building temperature. At lower temperatures, less thermal ageing of the powder takes place (see results of embodiment 1). In addition, a better flow of the material may also mean that with older material, it is nevertheless possible to build well and without sink marks, i.e. less virgin powder needs to be added. Overall, this leads to improved economy compared to pure fibre-in-grain powder (pure composite). In a preferred embodiment, the powder mixture according to the invention is thus a dry blend of the first powder and the second powder.

Furthermore, the processing of the powder mixture according to the invention may result in a reduced warpage of the manufactured component, which may be due to a lower tendency to crystallisation, for example. As a result, it may be possible to work at a lower building frame temperature than with the pure composite. This leads to a reduced ageing of the powder in the process and to a further improvement of the refreshment rate.

The advantageous combinations of properties realised by the present invention are mainly considered as a result of the reinforcement material embedded in the first thermoplastic polymer material having a beneficial effect on the mechanical properties, while the absence of the reinforcement material in the second thermoplastic polymer material has a beneficial effect on the lower component temperature, the process window and the refreshment rate. As a result, an excellent compromise is found between (compared to correspondingly fibre-unreinforced objects improved) mechanical properties and (compared to the known fibre-reinforced objects more economical and safer with respect to the process) manufacturability as well as appearance (optical quality of the built components and/or surface quality of the built components).

In principle, it is possible that the first thermoplastic polymer material and the second thermoplastic polymer material are different from each other. In a preferred embodiment, however, they are the same thermoplastic polymer material. Likewise, the presence of one or more further thermoplastic polymer materials, i.e. a further polymer powder component in the powder mixture, is not excluded. However, it is preferable that no further thermoplastic polymer material is present in the powder mixture.

Preferably, the first thermoplastic polymeric material is a polymeric material selected from the group consisting of homopolymers, copolymers, block copolymers and polyblends (also known as polymer blends). Preferably, the second thermoplastic material is also a polymeric material selected from the group consisting of homopolymers, copolymers, block copolymers and polyblends. In particular, the thermoplastic polymeric material of the first powder and the thermoplastic polymeric material of the second powder is a polymeric material selected from the same group consisting of homopolymers, copolymers, block copolymers and polyblends. The polymeric material is a thermoplastic material and may be amorphous or melt amorphous (in DSC measurements at a cooling rate of 20° C./min, essentially no crystallisation or no crystallisation at all is observed), pseudo amorphous (in the first heating run of DSC measurements at a heating rate of 20° C./min at least one melt peak is present, determined according to DIN EN ISO 11357, but when cooled at a cooling rate of 20° C./min there is essentially no crystallisation) or semi-crystalline (in DSC measurements at a heating rate of 20° C./min there is at least one melting peak, according to DIN EN ISO 11357). Preferably, the powder is a semi-crystalline polymer material. The components can either be essentially semi-crystalline or essentially amorphous. The latter is also the case if the polymer material is a crystallised melt amorphous polymer material. In particular, the polymer material also exhibits a crystallisation peak, i.e. the components are substantially semi-crystalline. In a preferred embodiment, the components are semi-crystalline.

A polyblend (also referred to as a "polymer blend") is a mixture of several polymers. A polyblend may be a single-phase polyblend (homogeneous polyblend) or a multi-phase polyblend (heterogeneous polyblend). In the case of a multi-phase polyblend, several glass transitions are typically observed by means of differential scanning calorimetry. Furthermore, in the case of a multiphase polyblend, multiple melting peaks corresponding to the melting points of the individual phases can be observed by means of differential scanning calorimetry. In the case of a multi-phase polyblend, it may be possible that the maximum processing temperature is below the highest but above the second highest melting point.

According to the invention, polyblends may be formed from homopolymers and/or copolymers and/or block copolymers. Preferably, polyblends comprise at least two of the polymers and/or copolymers and/or block copolymers described below. Preferably, the polyblend is a blend of a semi-crystalline and an amorphous or pseudoamorphous polymer material.

The thermoplastic polymer material of the first and/or second powder may comprise a polymer material selected from the group consisting of the following polymers, or a polymer blend of at least two polymers selected from the group consisting of the following polymers: polyetherimides, polycarbonates, polyarylene sulfides, polyarylethersulfones, polyphenylene oxides, polyether sulfones, acrylonitrile-butadiene-styrene copolymers, acrylonitrile-styrene-acrylate copolymers (ASA), polyvinyl chloride, polyacrylates, polyesters, polyamides, polyaryletherketones, polyethers, polyurethanes, polyimides, polyamideimides, polysiloxanes, polyolefins and copolymers which have at least two different repeating units of the aforementioned polymers, wherein the group preferably consists of polyaryletherketones, polyphenylene sulfides, polycarbonates, polyetherimides, polypropylene, polyethylene and polyamides and their copolymers and polymer blends.

For example, suitable PAEK polymers and copolymers are preferably selected from the group consisting of polyetheretherketone (PEEK), polyetherketoneketone (PEKK), polyetherketone (PEK), polyetheretherketoneketone (PEEKK), polyetherketoneetherketoneketone (PEKEKK), polyetheretheretherketone (PEEEK), polyetheretherkctone-polyetherdiphenyletherketone (PEEK-PEDEK) and copolymers including at least one of the aforementioned polymers.

According to a preferred embodiment, the thermoplastic polymer material of the first powder and/or the thermoplastic polymer material of the second powder comprises a polymer of the class of polyaryletherketones (PAEK), wherein the polyaryletherketone preferably has a melting temperature $T_m$ (determined according to DIN EN ISO 11357) of at most 330° C., preferably of at most 320° C., in particular of at most 310° C., and/or wherein the polyaryletherketone has a glass transition temperature Tg (determined in accordance with DIN EN ISO 11357) of at least 120° C., preferably of at least 140° C., in particular of at least 150° C.

According to a preferred embodiment, the thermoplastic polymer material of the first powder and/or the thermoplastic polymer material of the second powder consists of a polymer of the class of polyetherketoneketones (PEKK). In this case, it is preferred that at the phenylene residues of the polyetherketoneketone (PEKK) which are connected to two carbonyl groups, at least 10%, preferably 60% and/or at most 70% of the carbonyl groups are in the para position and otherwise in the meta position. According to a further preferred embodiment, the thermoplastic polymer material of the first powder and/or the thermoplastic polymer material of the second powder consists of or comprises a polymer of the class of polyetheretherketone-polyetherdiphenyletherketones (PEEK-PEDEK) having the following repeating units:

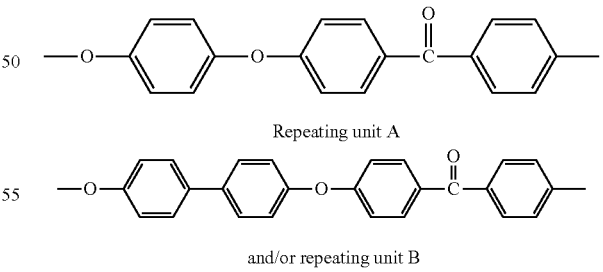

Repeating unit A and/or repeating unit B

Said polyetheretherketone-polyetherdiphenyletherketone polymer may preferably have a molar fraction of at least 68 mol %, preferably of at least 71 mol % of the repeating unit A. Particularly preferred polyetheretherketone-polyetherdiphenyletherketone polymers have a molar fraction of at least 71 mol %, or, further preferably of at least 74 mol % of the repeating unit A. Said polyetheretherketone-polyetherdiphenyletherketone polymer preferably has a molar content of less than 90 mol %, more preferably of 82 mol % or less, of the repeating unit A. Said polymer further comprises a preferred molar content of at least 68 mol %, more preferably at least 70 mol %, in particular at least 72 mol % of the repeating unit A. At most, the polyetheretherketone-polyetherdiphenyletherketone polymer has a preferred molar mass fraction of 82 mol %, particularly preferably of at most 80 mol %, in particular of at most 77 mol % of the repeating unit A.

Herein, the ratio of repeating unit A to repeating unit B is preferably at least 65 to 35 and/or at most 95 to 5.

Suitable polyamide polymers or copolymers may be selected from the group consisting of polyamide 6/6T, polyamide elastomers such as polyether block amides such as e.g. PEBAX™ based materials, polyamide 6, polyamide 66, polyamide 11, polyamide 12, polyamide 612, polyamide 610, polyamide 1010, polyamide 1212, polyamide PA6T/66, PA4T/46 and copolymers including at least one of the aforementioned polymers. Suitable polyester polymers or copolymers may be selected from the group consisting of polyalkylene terephthalates (e.g. PET, PBT) and copolymers thereof.

Preferably, the thermoplastic polymer material of the first powder and/or the thermoplastic polymer material of the second powder comprises or consists of a polymer of the class of polyamides (PA). Preferably, the polyamide is a polyamide 11 (PA 11) or polyamide 12 (PA 12).

Suitable polyolefin polymers or copolymers may be selected from the group consisting of polyethylene and polypropylene. Preferably, they are polypropylene-polyethylene copolymers. Suitable polystyrene polymers or copolymers may be selected from the group consisting of syndiotactic and isotactic polystyrenes. Suitable polyimide polymers or copolymers may be selected from the group consisting of polyarylamide, polybismaleinimide and in particular polyetherimide.

Preferably, the homopolymer or copolymer has a melting point Ts of 100 to 400° C., preferably 120 to 350° C. and more preferably 155 to 320° C.

Preferably, the glass transition temperature TG of the homopolymer or copolymer is in a range of −10 to 300° C., more preferably 50° C. to 300° C. and more preferably 85 to 250° C. and still more preferably 130 to 230° C.

Preferably, the homopolymer or copolymer has a number average Mn of at least 10 000, more preferably 15 000 to 200 000 and particularly 15 000 to 100 000, or a weight average Mw of at least 20 000, and more preferably 30 000 to 500 000 and particularly Mw 30 000 to 200 000.

The degree of polymerisation n of the homopolymer or copolymer is preferably 10 to 10 000, more preferably 20 to 5 000 and particularly 50 to 1 000.

The use of a suitable copolymer or a suitable polymer blend is a further preferable way of favourably influencing and reducing final crystallinities in the manufactured object. For PAEK, in addition to PAEK copolymers, copolymers with polyarylethersulfone (PAES) are preferred, in particular polyaryletherketone (PAEK)/polyarylethersulfone (PAES) diblock copolymers PAEK/PAES/PAEK triblock copolymers, more preferably PEK/PES diblock copolymers or PEK/PES/PEK triblock copolymers. For polyimides, polyetherimides are preferred.

The present invention is also particularly suitable for the use of polyblends. In particular, polyblends which consist of at least one semi-crystalline polymer and at least one amorphous polymer. In particular, such polyblends are suitable for improving the melting and solidification process and/or reducing the final crystallinity of the object built. Preferably, the polyblend comprises at least one polyetherimide and at least one other polymer.

Particularly preferably, polyblends comprise at least one polyetherimide and a polycarbonate or a polyaryletherketone, in particular a polyetherketoneketone (PEKK) or a polyphenylene sulfide, wherein more preferably the aforementioned amounts of the polyetherimide are present in such a polyblend.

Further preferable polyblends comprise at least
polyphenylene sulfide (PPS) and polyetherimide (PEI) or
polycarbonate and ABS or
polycarbonate and ASA or
polycarbonate and ABS and ASA. The starting materials used for manufacturing such polyblends are, for example, the polyblends marketed by Covestro under the trade name "Bayblend®".

Further preferred polyblends comprise at least one polyaryletherketone-polyarylether sulfone copolymer or polyaryletherketone-polyarylether sulfone copolymer.

Preferably, the polyblend is selected from the group consisting of polyblends of polyaryletherketones with polyetherimides and polycarbonates, polyblends of polyaryletherketones with polyimides, polyblends of polyaryletherketones with polyphenylene sulfones, polyblends of polyaryletherketones with polyether sulfones, and polyblends of polyaryletherketones with polyarylates.

With regard to the particle size of the powder particles, a mean particle size $d_{50}$ of at least 20 μm is suitable, preferably at least 30, at least 40, at least 50, at least 60 μm, particularly preferably at least 70 μm and/or at most 150 μm, preferably at most 140, 130, 120, 110, 100, particularly preferably at most 90 μm, in particular from 40 to 70 μm. In one embodiment, the aforementioned ranges refer to the mean particle size of the powder particles of the first powder. In another embodiment, the aforementioned ranges refer to the mean particle size of the powder particles of the second powder. In a preferred embodiment, the aforementioned ranges apply to the powder particles of the first powder and the second powder.

Mean particle sizes $d_{50}$ in the range of 40 to 70 μm are particularly preferred for the second powder. Average particle sizes $d_{50}$ in the range of 40 to 70 μm are also particularly preferred for the first powder, provided it does not contain microfibres. Mean particle sizes $d_{50}$ in the range of 70 to 100, on the other hand, are particularly preferred if the first powder contains microfibres, wherein microfibres are fibres with a fibre diameter in the micron range of at least 1 μm, e.g. in the case of glass fibres, carbon fibres, wollastonite fibres, etc. Only if the particle size is sufficiently high, a certain aspect ratio of the fibres in the grain may be achieved, so that the modulus of elasticity also increases significantly. If the particle size is too small, the increase in the modulus of elasticity is smaller. For reinforced powders with nanofibres, i.e. fibres with a fibre diameter <1 μm, such as in carbon nanotubes or nanofillers, mean particle sizes $d_{50}$ in the range of 40 to 70 μm are preferred.

A particularly balanced property profile may be achieved if the relative amount of the first powder, the relative amount of the second powder and/or the relative amount of the reinforcement material are within certain ranges.

Thus, the amount of the second powder in preferred powder mixtures is at least 1% by volume, preferably 5% by volume, particularly preferably 10 or 20 and/or at most 90% by volume, preferably at most 70% by volume, particularly preferably at most 50%, in each case relative to the total volume of the powder mixture.

The amount of the first powder is preferably in the range from 10 to 99% by volume, preferably in the range from 30 to 95% by volume and in particular in the range from 50 to 90% by volume, in each case based on the total volume of the powder mixture.

Based in each case on the total weight of the powder mixture, the amount of the reinforcement material in certain embodiments is at least 10%, preferably at least 15% by weight and particularly preferably at least 20% and/or at most 60% and preferably at most 50% and particularly preferably at most 40% and in particular at most 35%. In certain embodiments, the amount of reinforcement material is 35 (±5) %, 40 (±5) % or 50 (±5) %, in each case based on the total weight of the powder mixture.

Further examples of amount proportions of powder mixtures according to the invention are characterised in the following table:

| Powder mixture | Amount of the first powder [in volume % relative to the total volume of the powder mixture] | Amount of the second powder [in volume % relative to the total volume of the powder mixture] | Amount of the reinforcement material contained in the first powder [in weight % relative to the total weight of the powder mixture] |
|---|---|---|---|
| 1 | 50-90 | 10-50 | 15-30 |
| 2 | 55-90 | 10-45 | 15-30 |
| 3 | 60-90 | 10-40 | 15-30 |
| 4 | 75-85 | 15-35 | 15-30 |
| 5 | 70-80 | 20-30 | 15-30 |
| 6 | 50-90 | 10-50 | 17-28 |
| 7 | 55-90 | 10-45 | 17-28 |
| 8 | 60-90 | 10-40 | 17-28 |
| 9 | 75-85 | 15-35 | 17-28 |
| 10 | 70-80 | 20-30 | 17-28 |
| 11 | 50-90 | 10-50 | 18-25 |
| 12 | 55-90 | 10-45 | 18-25 |
| 13 | 60-90 | 10-40 | 18-25 |
| 14 | 75-85 | 15-35 | 18-25 |
| 15 | 70-80 | 20-30 | 18-25 |
| 16 | 50 | 50 | 15-30 |
| 17 | 60 | 40 | 15-30 |
| 18 | 70 | 30 | 15-30 |
| 19 | 80 | 20 | 15-30 |
| 20 | 90 | 10 | 15-30 |
| 21 | 50 | 50 | 17-28 |
| 22 | 60 | 40 | 17-28 |
| 23 | 70 | 30 | 17-28 |
| 24 | 80 | 20 | 17-28 |
| 25 | 90 | 10 | 17-28 |
| 26 | 50 | 50 | 18-25 |
| 27 | 60 | 40 | 18-25 |
| 28 | 70 | 30 | 18-25 |
| 29 | 80 | 20 | 18-25 |
| 30 | 90 | 10 | 18-25 |

In addition, it is an object of the present invention to provide a method for manufacturing the powder mixture according to the invention. In this method, the first powder and the second powder are mixed together by dry mixing in a suitable and optionally predetermined mixing ratio, in particular in an amount corresponding to the relative amounts. Preferably, the first powder and the reinforcement material, and in preferred embodiments also the second powder, have the properties mentioned in the context of the description of the powder mixture according to the invention.

A further object of the present invention is a method for manufacturing a three-dimensional object, in particular by solidifying a building material in powder form in a layer-by-layer manner at the positions corresponding to the cross-section of the three-dimensional object in the respective layer, in particular by exposure to radiation. The building material is the powder mixture according to the invention in all variants described herein. The radiation is preferably electromagnetic radiation and/or waves, in particular laser radiation.

The three-dimensional object manufactured according to the invention is preferably characterised by at least one of the following properties:

(i) Compared to an object manufactured using only the second powder as the building material, the modulus of elasticity is higher, preferably by at least 10%, more preferably by at least 20% and in particular by at least 30% or even by at least 40% or at least 50%.

(ii) Compared to an object which has been manufactured only from the first powder as building material, the modulus of elasticity is lower by at most 25%, preferably by at most 20%, more preferably by at most 15% and in particular by at most 10%.

(iii) Compared to an object manufactured only from the first powder as building material, the refreshment factor is higher, wherein a higher refreshment factor is preferably characterised by a lower number of sink marks.

(iv) Compared to an object manufactured only from the first powder as building material, the preferential direction of the reinforcement material, and in particular of the fibres, is lower and/or the isotropy in the xyz-direction is higher, in particular with respect to the modulus of elasticity.

(v) Compared to an object manufactured using only the first powder as building material, the porosity is lower.

(vi) Compared to an object manufactured only from the second powder as building material, the ultimate tensile strength (UTS) is higher, preferably by 5%, more preferably lower 10%, in particular by 15%.

(vii) Compared to an object manufactured only from the first powder as building material, the ultimate tensile strength (UTS) is lower by at most 15%, preferably lower by at most 10%, more preferably lower by at most 5%.

(viii) Compared to an object manufactured only from the first powder as building material, the elongation at break is higher, preferably by 10%, more preferably by 30% and in particular by 50% higher or even by 100% higher.

Preferably, the three-dimensional object manufactured according to the invention is characterised by one of the following combinations of the aforementioned properties (i) to (vii):

(i), (ii), (vi) and (vii);
(i), (ii), (iii), (vi) and (vii);
(iii), (vi) and (vii);
(i), (ii) and (viii);
(vi), (vii) and (viii);
(i), (ii), (vi), (vii) and (viii)
(iii) and (viii).

Moreover, preferably the elongation at break of the three-dimensional object manufactured according to the invention is higher than that of a component manufactured using only the second powder as the building material.

When a comparison is made between the powder mixture according to the invention and the first powder alone, the amount of reinforcement material is the same in relation to the weight of the powder mixture or in relation to the weight of the first powder alone. The same applies to a comparison between the three-dimensional object manufactured from the powder mixture according to the invention as building material and a component manufactured from the first powder alone.

The three-dimensional object manufactured according to the invention preferably has a porosity of at most 10%, preferably at most 7%, more preferably at most 5% and in particular at most 4%.

The final crystallinity of the three-dimensional object is preferably 80% or less, more preferably 50% or less, in particular 5-70%, still more preferably 15-50% and especially 15-35%. Specifically, when polyaryletherketones (PAEK) are used as the thermoplastic polymer material, the final crystallinity in the object manufactured according to the invention is preferably 5 to 45%, preferably 10 to 40%, more preferably 15 to 35%, still more preferably 15 to 30%, and particularly 20 to 25%. Specifically for polyamides (PA), the final crystallinity in the object manufactured according to the invention is preferably 10 to 50%, more preferably 15 to 40%, still more preferably 15 to 35%, and particularly 20 to 30%.

By using the powder mixture according to the invention instead of a powder that does not contain a second powder, the lowest possible building temperature may be lowered in a predefined method for manufacturing a three-dimensional object by solidifying a powdered building material layer by layer at the positions corresponding to the cross section of the three-dimensional object in the respective layer by exposure to radiation. Accordingly, a preferred embodiment is characterised in that the lowest temperature at which solidification of the building material may be performed is lowered compared to the use of a building material containing only the first powder. Preferably, said temperature is lowered by at least 1° C., 2° C., 3° C., 4° C. or 5° C., particularly preferably by at least 6, 7, 8, 9, 10, 11, 12 or even 13° C.

If required, a compromise between lowest possible warpage and low final crystallinity may be achieved by a controlled, slow cooling step. Therefore, in a preferred embodiment, the method according to the invention comprises a controlled cooling step. That is, the manufactured three-dimensional object is subjected to defined temperatures such that it cools in a controlled and/or desired manner. For example, the cooling rate may be 0.01-10° C./min, preferably at least 0.1° C./min and/or at most 5° C./min, and more preferably at least 1° C./min and/or at most 5° C./min. Preferably, the cooling step occurs within 10 minutes, more preferably within 5 minutes, more preferably within 3 minutes, in particular within 1 minute after exposure of the last layer of the pulverulent building material to radiation. The controlled cooling step may be realised by a preselected cooling rate. It may be slowly cooled, possibly slower than natural (passive) cooling, or fast (active cooling). A cooling profile of different cooling speeds may also be applied.

It should be noted that the cooling rate may also affect the curling and consequently the plastic stability (i.e. component warpage) of the object. The ideal cooling rate or cooling profile depends on the powder mixture used, in particular the thermoplastic polymer material, as well as the proportions of first and second powder, and may be determined experimentally under the condition that the crystallinity and plastic stability of the manufactured object are within the desired range, preferably as low as possible.

To make the process more economical and environmentally friendly, some of the unsolidified building material left over from a previous manufacturing cycle ("used powder") may be reused in a subsequent cycle. For this purpose, the used powder is mixed with virgin powder mixture ("virgin powder") in a predetermined ratio. In a preferred embodiment, the building material thus comprises an amount of used powder, which has previously remained as unsolidified building material during the manufacturing of an object, and an amount of virgin powder, which has not previously been used in the manufacturing of an object. Preferably, the amount of virgin powder is at most 60% by weight, in particular at most 50%, 40%, 30% or even 20% by weight.

The object of the present invention is also a three-dimensional object which has been manufactured by solidifying a pulverulent building material layer by layer at the positions corresponding to the cross-section of the three-dimensional object in the respective layer, in particular by exposure to radiation. The building material is the powder mixture according to the invention in all variants described here.

The three-dimensional object according to the invention can optionally be characterised by the fact that the reinforcement material contained therein, in at least an inner part or in the entire inner part of the three-dimensional object, is inhomogeneously distributed, wherein preferably the inhomogeneous distribution of the reinforcement material occurs regularly in the corresponding part of the three-dimensional object. The microstructure of the three-dimensional object according to the invention may optionally alternatively or additionally be characterised as resulting from the use of the powder mixture according to the invention as building material. The different distribution of the reinforcement material may result from the fact that in the short period between the melting of the powder mixture at the defined irradiated positions and the re-solidification, the solid, relatively low-mobility particles of the reinforcement material from the first powder do not mix so quickly with the polymer from the second powder and thus different concentrations result locally after solidification. The resulting microstructure or the locally different concentrations of reinforcement material can be described, determined and, if desired, quantified, for example by making cuts or ground slices of the three-dimensional object, for example by microtome cuts, as well as observation by (micro)optical methods.

Preferably, the three-dimensional object according to the invention exhibits the properties already mentioned above; furthermore, those properties can be attributed to the product which result from the use of the powder mixture according to the invention and/or the method according to the invention for manufacturing the three-dimensional object.

A further object of the present invention is the use of the powder mixture according to the invention for increasing the refreshment rate, improving the warpage and/or improving the mechanical properties, in particular the elongation at break, of a three-dimensional object which has been manufactured by solidifying the powder mixture serving as the building material in layers at the positions corresponding to the cross-section of the three-dimensional object in the respective layer, in particular by exposure to radiation.

In the context of the present invention, the terms "comprising" or "containing" and their grammatical variations have the following meanings: In an embodiment, further elements may be included in addition to those mentioned. In another embodiment, substantially only the elements mentioned are included. In other words, in addition to their conventional meaning, the terms in one embodiment may be synonymous with the term "consisting essentially of" or "consisting of".

Further preferred embodiments are described below:

1. Powder mixture for the use as building material for manufacturing a three-dimensional object by solidifying the building material layer by layer at the positions corresponding to the cross-section of the three-dimensional object in the respective layer, in particular by exposure to radiation,
   wherein the powder mixture contains a first powder and a second powder,
   wherein the first powder comprises powder particles of a first thermoplastic polymer material and a reinforcement material,
   wherein the reinforcement material is at least partially embedded in the powder particles of the first powder and/or adhered to the surface of the powder particles of the first powder,
   wherein the second powder comprises powder particles of a second thermoplastic polymer material which is the same as or different from the first thermoplastic polymer material, and
   wherein the powder particles of the second powder do not contain the reinforcement material or contain it only in an amount of at most 50% by weight relative to on the amount of the reinforcement material in or on the powder particles of the first powder.

2. Powder mixture according to embodiment 1,
   wherein the powder mixture is characterized by a lowest possible building temperature in a predefined process for manufacturing a three-dimensional object by solidifying a pulverulent building material layer by layer at the positions corresponding to the cross-section of the three-dimensional object in the respective layer by exposure to radiation, which is lower than the lowest possible building temperature of the first powder alone, preferably lower by 1° C., more preferably lower by 2° C., in particular lower by 5° C.

3. Powder mixture according to any one of the preceding embodiments,
   wherein the powder mixture is characterised by a process window which is equal to or larger, preferably larger, compared to the process window of the first powder alone,
   wherein the process window is defined as the difference between the highest possible building temperature and the lowest possible building temperature in a predefined process for manufacturing a three-dimensional object by solidifying a pulverulent building material layer by layer at the positions corresponding to the cross-section of the three-dimensional object in the respective layer by exposure to radiation.

4. Powder mixture according to any one of the preceding embodiments,
   wherein the thermoplastic polymer material of the first powder and/or the thermoplastic polymer material of the second powder is a polymer material selected from the group consisting of homopolymers, copolymers and polyblends.

5. Powder mixture according to any one of the preceding embodiments,
   wherein the thermoplastic polymer material of the first powder and/or the thermoplastic polymer material of the second powder comprises a polymer selected from the group consisting of polyetherimides, polycarbonates, polyarylene sulfides, polyarylether sulfones, polyphenylene oxides, polyether sulfones, acrylonitrile-butadiene-styrene copolymers, acrylonitrile-styrene-acrylate copolymers (ASA), polyvinyl chloride, polyacrylates, polyesters, polyamides, polyaryletherketones, polyethers, polyurethanes, polyimides, polyamideimides, polysiloxanes, polyolefins and copolymers which have at least two different repeating units of the aforementioned polymers, as well as polymer blends thereof, more preferably a polymer of the class of polyaryletherketones, polyphenylene sulfides, polycarbonates, polyetherimides, polypropylene, polyethylene and polyamides and copolymers and polymer blends thereof,
   in particular wherein the thermoplastic polymer material of the first powder and/or the thermoplastic polymer material of the second powder comprises a polyetherketoneketone (PEKK), a polyamide 11 (PA 11), a polyamide 12 (PA 12) or a polyamide 6 (PA 6).

7. Powder mixture according to embodiment 6,
   wherein at least 10%, preferably 60% and/or at most 70%, of the carbonyl groups on the phenylene radicals of the polyetherketoneketone (PEKK) which are bonded to two carbonyl groups are in the para position and otherwise in the meta position.

8 Powder mixture according to any one of the preceding embodiments,
   wherein the reinforcement material is substantially completely embedded in the grain of the powder particles of the first powder.

8a. Powder mixture according to any one of the preceding embodiments,
   wherein the reinforcement material is substantially particulate, platelet-like and/or fibrous.

9. Powder mixture according to any one of the preceding embodiments,
   wherein the reinforcement material comprises fibres or is formed substantially solely by fibres, wherein more preferably the fibres are selected from the group consisting of carbon fibres, organic fibres and preferably aramid fibres, inorganic fibres and preferably glass fibres and/or boron fibres and/or wollastonite fibres and/or mineral fibres, and combinations thereof, and/or
   wherein the reinforcement material comprises nanotubes, preferably carbon nanotubes, and/or
   wherein the reinforcement material comprises graphite nanoplatelets and/or fullerenes and/or
   wherein the reinforcement material comprises platelet-shaped reinforcement materials, preferably phyllosilicates, such as preferably mica, (2:1) trilayer silicates such as montmorillonite and hectorite, and organophilically modified cation-exchanged trilayer silicates.

10. Powder mixture according to any one of embodiments 1 to 8,
    wherein the reinforcement material essentially comprises spherical fillers, or irregularly shaped low aspect ratio fillers, preferably inorganic and mineral fillers such as preferably glass spheres, hollow glass spheres or quartz powder, talc, calcium carbonate and spherical chalk particles, kaolins and amorphous silicas and silicates, ceramic particles, such as preferably boron nitride, aluminium oxide, zirconium oxide, silicates, silicon dioxide, zirconium (IV) oxide, titanium (IV) oxide, aluminium titanate, barium titanate, silicon carbide (SiC) and boron carbide (B4C), metals, such as preferably bronze or aluminium powder and organic fillers, preferably elastomeric filler particles based on EPDM or EPR.

11. Powder mixture according to any one of embodiments 1 to 8,
    wherein the reinforcement material comprises a flame retardant of the class of inorganic flame retardants, preferably inorganic phosphorus compounds, metal oxides, metal hydroxides, metal salts, boron and zinc compounds, silicon compounds and graphite and/or nitrogen-based flame retardants based on melamine, and wherein the concentration of the flame retardant is preferably 20 to 60% by weight.

In preferred embodiments, these include aluminium hydroxide [Al(OH)3], borax and boric acid, magnesium hydroxide [Mg(OH)2], expanded graphite/expandable graphite, ammonium sulfate [(NH4)2SO4], ammonium phosphate and polyphosphate [(NH4)3PO4], red phosphorus, antimony trioxide (Sb2O3) antimony pentoxide (Sb2O5), zinc borates, slaked lime [Ca(OH)2], melamine cyanurate and melamine polyphosphate.

12. Powder mixture according to any one of the preceding embodiments,
    wherein the mean particle size d50 of the powder particles of the first and/or the second powder is at least 20 µm, preferably at least 40 µm, more preferably at least 70 µm and/or at most 150 µm, preferably at most 110 µm, more preferably at most 90 µm, wherein in particular the mean particle size d50 of the first and/or the second powder is as follows:
    (a) 40 to 70 µm for the second powder and/or 40 to 70 µm for the first powder, and/or
    (b) 40 to 70 µm for the second powder and/or 70 to 100 µm for the first powder, if the first powder comprises microfibres (fibres with diameters in the micrometre range).

13. Powder mixture according to any one of the preceding embodiments,
    wherein the amount of the second powder is at least 1% by volume, preferably 5% by volume, more preferably 10% by volume, further preferably 15% by volume and particularly preferably 20% by volume and/or at most 70% by volume, preferably at most 60% by volume, further preferably at most 40% by volume and particularly preferably at most 30% by volume, in each case based on the total volume of the powder mixture.

14. Powder mixture according to any one of the preceding embodiments, wherein the fibres have a mean diameter in the range from 1 to 50 µm.

15. Powder mixture according to any one of the preceding embodiments,
    wherein the first powder and/or the second powder is/are produced
    (i) by grinding, preferably melt compounding and grinding or cryogenic grinding;
    (ii) by melt spraying;
    (iii) by precipitation from solvents;
    (iv) by melt compounding and melt dispersion;
    (v) by melt compounding and by fibre spinning and fibre cutting, wherein after spinning the fibres are optionally stretched to increase the crystalline amount;
    (vi) by coating the polymer onto the filler, or the filler onto the polymer by a mechanical or thermomechanical treatment (e.g. with a high-speed mixer or with the Nara Hybridization System (NHS) of Nara Machinery Co., Ltd, Frechen, Germany); or
    (vii) by coating the polymer onto the filler, or the filler onto the polymer by spray coating with solvent or spray drying.

16. Powder mixture according to any one of the preceding embodiments,
    wherein the amount of the first powder is in the range of from 30 to 99 volume percent, preferably in the range of from 40 to 95 volume percent, more preferably in the range of from 50 to 90 volume percent, each based on the total volume of the powder mixture.

17. Powder mixture according to any of the preceding embodiments,
    wherein the powder mixture contains functional additives, wherein the functional additives are preferably selected from: preferably dry admixed free flow aids, thermal and/or thermooxidative stabilizers, UV stabilizers, infrared absorbers, colour pigments and halogenated flame retardants, which are preferably contained in the grain of the first and second powders.

18. Powder mixture according to one of the preceding embodiments having a bulk density of 0.35 to 0.70 g/cm$^3$, preferably at least 0.4 or at least 0.42 or at least 0.48 or at least 0.50 or at least 0.54, and/or at most 0.65 g/cm$^3$, further preferably at least 0.45 or at least 0.5 and/or at most 0.6 g/cm$^3$, and/or a BET of <10 m$^2$/g, preferably <5 m$^2$/g, more preferably <3 m$^2$/g and in particular <1 m$^2$/g.

19. Powder mixture according to any one of the preceding embodiments, wherein the MVR value of the second powder is lower or higher than the MVR value of the first powder, in each case determined by the same method, wherein preferably the MVR value of the second powder is 0.1 to 10 times the value of the first powder, further preferably the MVR value of the second powder is 0.25 to 5, more preferably 0.5 to 4, in particular greater than 1 to 3 and very particularly preferably 1.1 to 2 times the value of the first powder.

20. Powder mixture according to one of the preceding embodiments, wherein the melting point and/or the extrapolated initial temperature ($T_{ei, m}$) of the second powder is lower or higher than that of the first powder, preferably lower or higher by at most 30° C., more preferably lower or higher by at most 20° C., particularly preferably lower or higher by at most 10° C. and in particular lower or higher by at most 5° C. and very particularly preferably lower or higher by at most 3° C., 2° C. or 1° C., very particularly preferably equal or lower as aforesaid.

21. Method of preparing a powder mixture for the use as building material for manufacturing a three-dimensional object by solidifying the building material layer by layer at the positions corresponding to the cross-section of the three-dimensional object in the respective layer, in particular by exposure to radiation,
    wherein the first powder and the second powder are as defined in any one of the preceding embodiments and are mixed together in a desired mixing ratio by dry mixing.

22. Method according to embodiment 21,
    wherein the first powder and the second powder are mixed together by dry mixing.

23. Method of preparing a polymer powder for the use as building material for manufacturing a three-dimensional object by solidifying the building material layer by layer at the positions corresponding to the cross-section of the three-dimensional object in the respective layer, in particular by exposure to radiation,
    wherein the preparation of the polymer powder includes the steps of melting a polymer material, in particular the polymer defined in embodiment 5, and compounding/incorporating at least one reinforcement material into the melt, then either still during this step of compounding or after compounding, spinning the melt containing the reinforcement material,
optionally or preferably stretching the resulting spun fibres, and
then granulating or cutting the fibres containing the reinforcement material, and optionally, in order to obtain preferably a particle size characteristic as defined in embodiment 12 and/or one or more of the properties defined in embodiments 18 to 20, subjecting the fibres to a rounding treatment.

24. Method according to embodiment 23, wherein the polymer is polyaryletherketone (PAEK), preferably selected from the group consisting of polyetheretherketone (PEEK), polyetherketoneketone (PEKK), polyetherketone (PEK), polyetheretherketoneketone (PEEKK), polyetherketoneetherketoneketone (PEKEKK), polyetheretheretherketone (PEEEK), polyetheretherketone-polyetherdiphenyletherketone (PEEK-PEDEK) and copolymers including at least one of the aforementioned polymers, wherein the polymer in particular comprises or consists of PEKK.

25. Polymer powder containing reinforcement material, obtainable by the process according to embodiment 23 or 24.

26. Process for manufacturing a three-dimensional object by layer-by-layer solidification of a pulverulent building material at the positions corresponding to the cross-section of the three-dimensional object in the respective layer, in particular by exposure to radiation,
    wherein a powder mixture according to one of embodiments 1 to 20 is used as the building material.

27. Method according to embodiment 26,
    wherein the three-dimensional object is characterised by at least one of the following properties (i) to (vii):
    (i) compared to a component manufactured only from the second powder as building material, the modulus of elasticity is higher, preferably by at least 10%, more preferably by at least 20% and in particular by at least 30% or even by at least 40% or at least 50% higher;
    (ii) compared to a component manufactured only from the first powder as building material, the modulus of elasticity is lower by at most 25%, preferably by at most 20%, more preferably by at most 15% and in particular by at most 10%;
    (iii) compared to a component manufactured only from the first powder as building material, the refreshment factor is higher, wherein a higher refreshment factor is preferably characterised by a lower number of sink marks;
    (iv) compared to a component manufactured only from the first powder as building material, the preferential direction of the functional additive, preferably of the reinforcement material and in particular of the fibres, is lower and/or the isotropy in the xyz direction is higher, in particular with respect to the modulus of elasticity;
    (v) compared to a component manufactured using only the first powder as the building material, the porosity is lower;
    (vi) compared to a component manufactured only from the second powder as building material, the ultimate tensile strength (UTS) is higher, preferably by 5%, more preferably by 10% and in particular by 15%;
    (vii) compared to a component manufactured only from the first powder as building material, the ultimate tensile strength (UTS) is lower by at most 15%, preferably lower by at most 10%, more preferably lower by at most 5%;
    (viii) compared to a component manufactured only from the first powder as building material, the elongation at break is higher, preferably by 10%, more preferably by 30% and in particular by 50% higher or even by 100% higher.

28. Method according to embodiment 27, wherein the three-dimensional object is characterised by one of the following combinations of properties:
    (i), (ii), (vi) and (vii);
    (i), (ii), (iii), (vi) and (vii);
    (iii), (vi) and (vii);
    (i), (ii) and (viii);
    (vi), (vii) and (viii);
    (i), (ii), (vi), (vii) and (viii);
    (iii) and (viii).

29. Method according to any one of embodiments 26 to 28,
wherein the three-dimensional object has a higher elongation at break compared to a component manufactured using only the second powder as the building material.
30. Method according to any one of embodiments 26 to 29,
wherein the three-dimensional object has a porosity of at most 10%, preferably at most 7%, more preferably at most 5% and in particular at most 4%.
31. Method according to any one of embodiments 26 to 30, wherein the three-dimensional object has a final crystallinity of 80% or less, preferably 50% or less, more preferably 5-70%, still more preferably 15-50% and particularly preferably 15-35%.
32. Method according to any one of embodiments 26 to 31,
wherein the building material comprises an amount of used powder which has previously been left over as unsolidified building material during the manufacturing of an object, and an amount of virgin powder which has not previously been used in the manufacturing of an object, and wherein the amount of virgin powder is at most 60% by weight, in particular at most 50%, 40%, 30% or even 20% by weight.
33. Three-dimensional object which has been manufactured by solidifying a pulverulent building material in a layer-by-layer manner at the positions corresponding to the cross-section of the three-dimensional object in the respective layer, in particular by exposure to radiation,
wherein the building material is a powder mixture according to any one of the preceding embodiments 1 to 20.
34. Three-dimensional object which has been manufactured by solidifying a pulverulent building material layer by layer at the positions corresponding to the cross-section of the three-dimensional object in the respective layer, in particular by exposure to radiation,
wherein the building material is a polymer powder containing reinforcement material according to embodiment 25.
35. Three-dimensional object according to embodiment 33, wherein the three-dimensional object is characterised by at least one of the following properties (i) to (vii):
(i) compared to a component manufactured only from the second powder as the building material, the modulus of elasticity is higher, preferably by at least 10%, more preferably by at least 20% and in particular by at least 30% or even by at least 40% or at least 50%;
(ii) compared to a component manufactured only from the first powder as building material, the modulus of elasticity is lower by at most 25%, preferably by at most 20%, more preferably by at most 15% and in particular by at most 10%;
(iii) compared to a component manufactured only from the first powder as building material, the refreshment factor is higher, wherein a higher refreshment factor is preferably characterised by a lower number of sink marks;
(iv) compared to a component manufactured only from the first powder as building material, the preferential direction of the reinforcement material, and in particular of the fibres, is lower and/or the isotropy in the xyz-direction is higher, in particular with respect to the modulus of elasticity;
(v) compared to a component manufactured using only the first powder as building material, the porosity is lower;
(vi) compared to a component manufactured only from the second powder as building material, the ultimate tensile strength (UTS) is higher, preferably by 5%, more preferably by 10% and in particular by 15%;
(vii) compared to a component manufactured only from the first powder as building material, the ultimate tensile strength (UTS) is lower by at most 15%, preferably lower by at most 10%, more preferably lower by at most 5%;
(viii) compared to a component manufactured only from the first powder as building material, the elongation at break is higher, preferably by 10%, more preferably by 30% and in particular by 50% higher or even by 100% higher.
36. Three-dimensional object according to embodiment 35, wherein the three-dimensional object is characterised by one of the following combinations of properties:
(i), (ii), (vi) and (vii);
(i), (ii), (iii), (vi) and (vii);
(iii), (vi) and (vii);
(i), (ii) and (viii);
(vi), (vii) and (viii);
(i), (ii), (vi), (vii) and (viii)
(iii) and (viii).
37. Three-dimensional object according to any one of embodiments 32, 33, 35 or 36, wherein the three-dimensional object has a higher elongation at break compared to a component manufactured using only the second powder as the building material.
38. Three-dimensional object according to any one of embodiments 32, 33 or 35 to 37, wherein the three-dimensional object has a porosity of at most 10%, preferably at most 7%, more preferably at most 5% and in particular at most 4%.
39. Three-dimensional object according to any one of embodiments 32 to 38, wherein the three-dimensional object has a final crystallinity of 80% or less, preferably 50% or less, more preferably 5-70%, still more preferably 15-50% and particularly preferably 15-35%.
40. Use of a powder mixture according to any one of embodiments 1 to 20 for increasing the refreshment rate, improving the warpage, improving the mechanical properties and/or lowering the crystallization temperature and/or the enthalpy of fusion of a three-dimensional object manufactured by solidifying the powder mixture serving as building material layer by layer at the positions corresponding to the cross section of the three-dimensional object in the respective layer, in particular by exposure to radiation, wherein in particular one or more of the changes defined in embodiments 33 to 35 are obtained.

BRIEF DESCRIPTION OF THE DRAWINGS

FIGS. 10 to 12 illustrate an example configuration of the Camsizer XT software depicting various parameter adjustments.

DETAILED DESCRIPTION OF THE EMBODIMENTS

Figure 1:
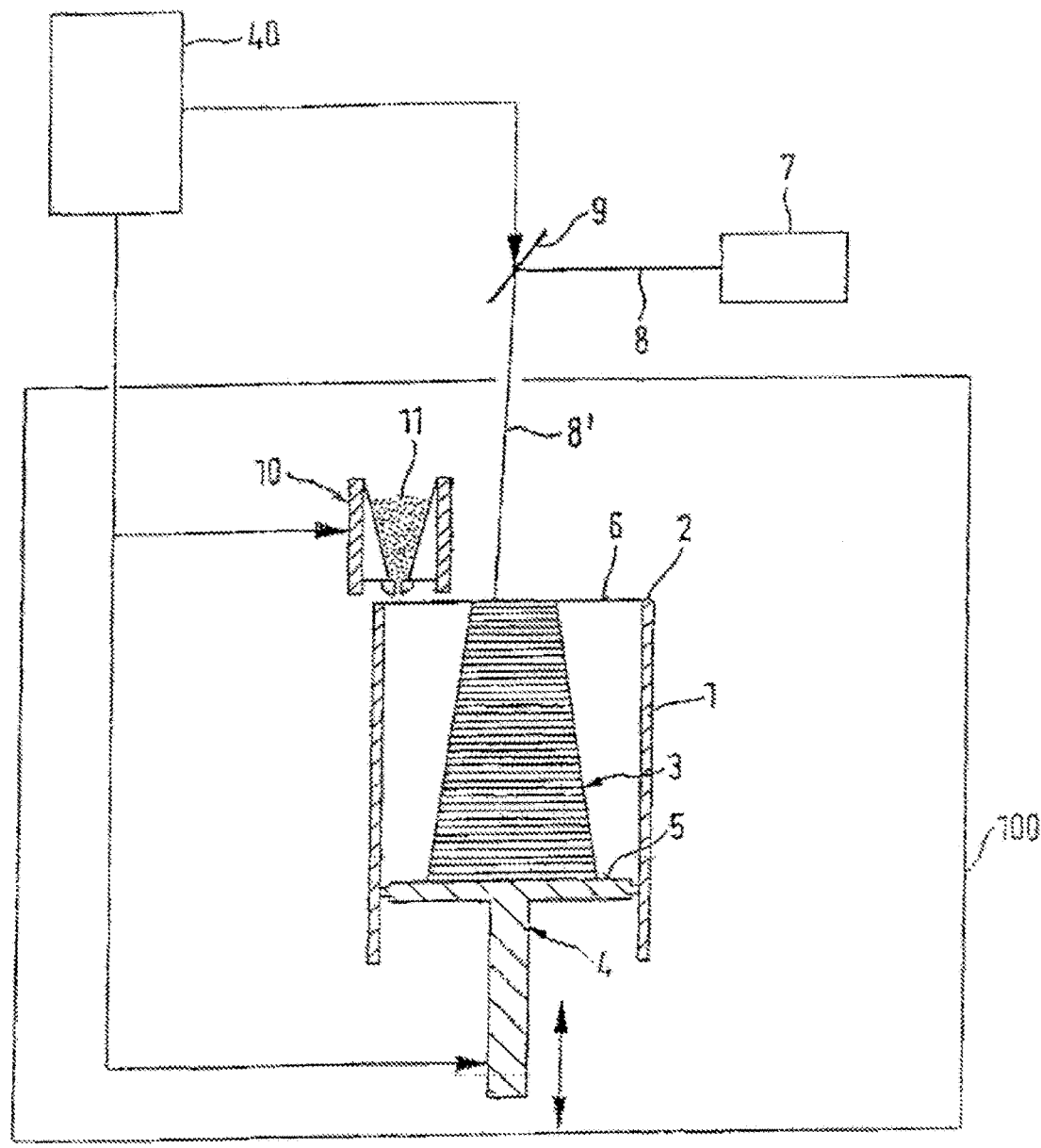
FIG. 1 shows an example of a laser sintering device for manufacturing a three-dimensional object layer by layer.

The following methods are basically suitable for determining certain properties of the articles according to the invention and were used in the experiments described below. They represent preferred methods for characterising certain properties of the objects according to the invention.

Determination of the Melt Volume-Flow Rate (MVR)

The melt volume-flow rate is used to characterise the flow behaviour (moulding material testing) of a thermoplastic material at specific pressure and temperature conditions. The test may basically be carried out according to ISO 1133-1: 2011 or ASTM D1238-10. If the thermoplastic material contains or is a polymer of the class of polyaryletherketones (PAEK), in particular PEKK, the test is preferably carried in conformity with ASTM D1238-10. If the thermoplastic material contains or is a polymer of the class of polyamides (PA), in particular PA 11, the test is preferably carried out in conformity with ISO 1133-1:2011.

In ISO 1133-1:2011, the melt volume-flow rate (MVR) of a thermoplastic material is determined by extruding the molten material from the cylinder through an extrusion tool of specified length and diameter under given conditions of temperature and applied load. The determination of the MVR in $cm^3/10$ min is a measurement method for the distance travelled by the piston in a defined time. The reproducibility of the results in the measurement depend on the room climate. The tests are carried out under standard climate according to DIN EN ISO 291 (23° C./50% rh), class 1 (+/−1° C.; +/−5%).

The MVR measurement for polymers of the class of polyaryletherketones (PAEK), in particular PEKK, is carried out on the device of the company Ceast with the software Ceast-View 6.3.1. Before the measurement, the powder (4.8 g) is pre-dried with the MA100 thermobalance from Sartorius at 120° C. for 11 minutes. The powder is then filled into the MVR device within 30 seconds. A weight of 5 KG is applied and the measurement is carried out according to ASTM D1238-10 at 380° C.

The MVR measurement for polymer of the class of polyamides (PA), in particular PA 11, is carried out on the MeltFlow device from the company Karg with the software k-base V4.00 Build 002 (E.Karg Industrietechnik). Before the measurement, the powder (4.5 g-5.5 g) is pre-dried in an inert atmosphere (<0.2 mbar) with the VacPrep 061 device from the company micromeritics for 30 min at 105° C. The powder is then dried in the VacPrep 061 device. The measurement is carried out according to ISO 1133-1:2011 at 255° C. with 5 kg weight.

Determination of the Mechanical Properties by Means of Tensile Testing

The mechanical properties of the three-dimensional objects according to the invention can be determined by means of test specimens as described below.

The test method and the component dimensions of the test specimens are specified by the ASTM D 638 standard for the tensile test. The materials testing machine TC-FR005TN.A50, dossier no.: 605922 from the company Zwick with the software TestExpert II V3.6 is suitable for this purpose.

In the standardised tensile test, test results such as modulus of elasticity [GPa], tensile strength [MPa], and elongation at break were determined with tensile test specimens of type I. The test speed is 5.6 mm/min for components made of PEKK and 50 mm/min for components made of PA11. The modulus of elasticity is determined at a test speed of 2 mm/min (PEKK) or 1 mm/min (PA11) at an elongation between 0.05 and 0.25%.

Determination of the Bulk Density of the Powders

The bulk density of the powders may be determined according to the EN ISO-60 standard.

Determination of the Specific BET Surface Area of the Powders

The BET surface area may be determined according to the method commonly used in the art. The method generally used in the art for BET determination is based on the adsorption of nitrogen. DIN ISO 9277 is known as the appropriate standard. The measurement can be conveniently carried out by using a commercial measuring device, for example a measuring device from the company Quantachrome, Nova Station A, which is equipped with software (Quantachrome Instruments v1 1.0) is suitable. Before the measurement, the sample to be measured may be degassed, for example at 80° C. under vacuum (e.g. about 100 mbar) for 2 hours. The evaluation may be done using the 5-point method.

Determination of the Extrapolated Initial Temperature of the Melting Peak

The material requires certain properties which may be determined from the extrapolated initial temperature $T_{ei,\,m}$ by means of Differential Scanning calorimetry, usually referred to as DSC. The corresponding DSC measurements for determining $T_{ei,\,m}$ are preferably carried out according to the ISO 11357 standard. A suitable device is, for example, Mettler Toledo DSC 823.

If the thermoplastic material contains or is a polymer of the class of polyaryletherketones (PAEK), especially PEKK, a temperature ramp of 0° C.-360° C.-0° C.-360° C. is followed deviating from the standard. At the initial temperature (0° C.), maximum temperature (360° C.) and minimum temperature (0° C.), the temperature is held for three minutes, but not at the final temperature (360° C.). Furthermore, the heating or cooling rate is 20K/min and the weighed-in quantity for the measurements is 4.5 mg to 5.5 mg.

If the thermoplastic material contains or is a polymer of the class of polyamides, in particular PA 11, a comparable method is used with the two differences that the maximum and final temperatures were 250° C., respectively.

Determination of the Sink Marks

The sink marks are determined using 25 cuboid test components (dimensions: 20 mm×4 mm×13.56 mm) which are distributed evenly over the building area in 5 rows. The surface under consideration is located in the xz-plane.

Determination of the Lower Building Temperature (Cross Test)

Figure 2:
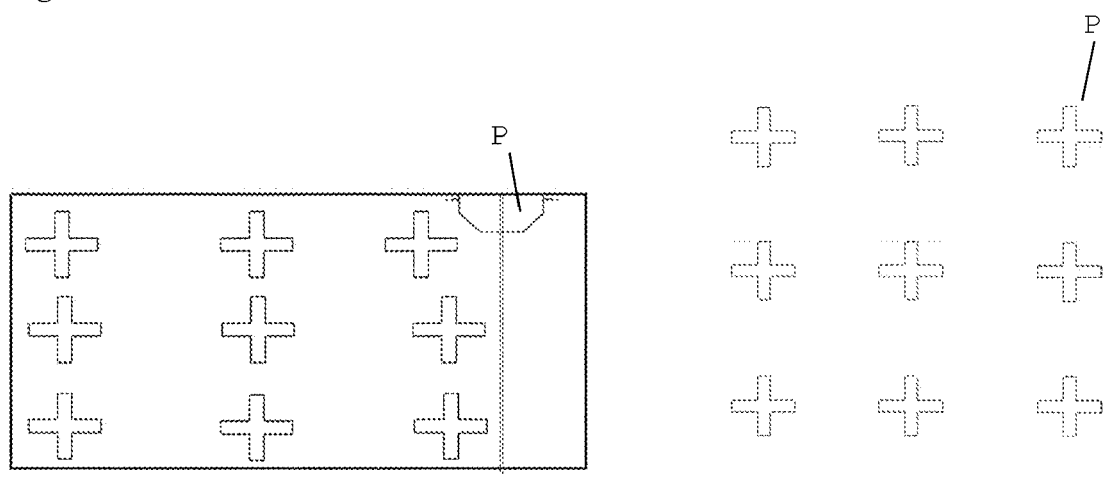
FIG. 2 shows the position of the cross-shaped test components and the pyrometer measuring spot ("P"; top right) on the EOS P800 with building chamber reduction (left) and the EOSINT P395 for determining the lower building temperature (cross test).

The lower building temperature (also Non-Curl Temperature=NCT) is determined by means of a cross test, i.e. a matrix of cross-shaped test components (3×3 on the reduced building platform of the P800, or distributed over the entire building area on the P395, FIG. 2). For this purpose, the laser sintering machine is warmed up to a temperature approx. 10° C. (estimated) below the usual building temperature or alternatively approx. 5° C. below the expected non-curl temperature. After automatic powder application, above a building height of z=6 mm, a layer of the crosses is irradiated. If they show strong process-critical curl, i.e. the edges of the exposed test crosses roll significantly upwards, the crosses are removed from the building space and the temperature is increased by 2° C. After applying 1.2 mm powder layers (P800, 10 layers of 0.12 mm layer thickness) or 2.4 mm (20 layers, P395), the test is repeated. If only little curl can be observed, the temperature is increased further in 1° C. steps until no process-critical curl can be observed any more in the cross test. This means that the crosses can be built to their full height (1.2 mm height) without being torn out of the powder bed by the recoater during the coating process. The temperature at which no process-critical curl can be observed any more is referred to as the non-curl temperature and defines the lowest possible building temperature. FIG. 2 shows the position of the cross-shaped test components and the pyrometer measuring spot ("P"; top right) on the EOS P800 with building space reduction (left) and the EOSINT P395.

The term "no process-critical curl" means that no curl can be observed or only minimal curl, but of such a low degree that the recoater can no longer tear the exposed crosses out of the powder bed during powder application.

Determination of the Maximum Building Temperature (Upper Building Temperature=UBT)

The maximum building temperature is the building temperature of the pulverulent material at which the pulverulent material just does not stick together, so that no aggregates of powder particles form, and the pulverulent material is still sufficiently flowable for the recoating process and no recoating defects occur (e.g. formation of stripes due to agglomerates). The maximum processing temperature depends in particular on the type of pulverulent material used.

However, the maximum building temperature may also be reached when there is just no formation of a (local) melt film of the powder, which can be recognised by a shiny film (e.g. polyamide 12, PA2200) or by a local dark colouring of the powder (e.g. EOS PEEK-HP3 described in the application instructions).

Figure 6:
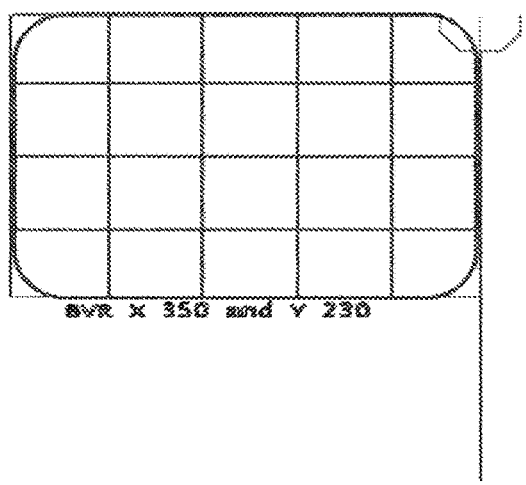
FIGS. 6 to 9 respectively show the building matrix for determining the Shore hardness of the powder bed hardness for determining the upper building temperature respectively on the EOS P810/P800, P396/P395, P770 and P110.
Figure 7:
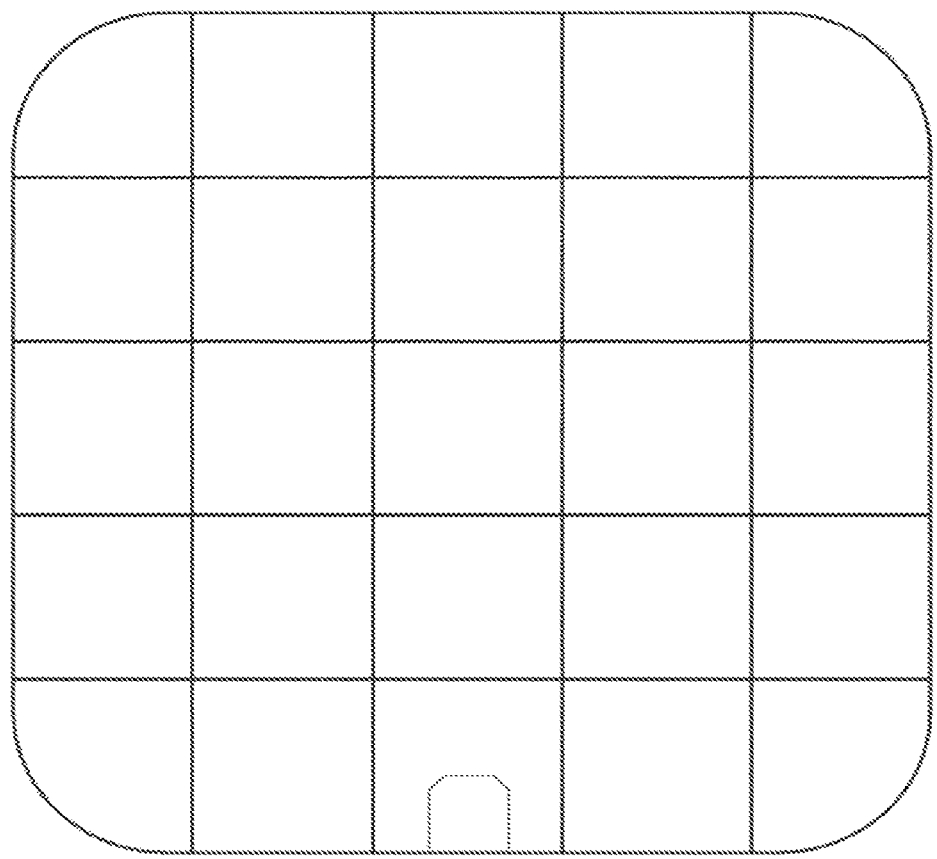
Figure 8:
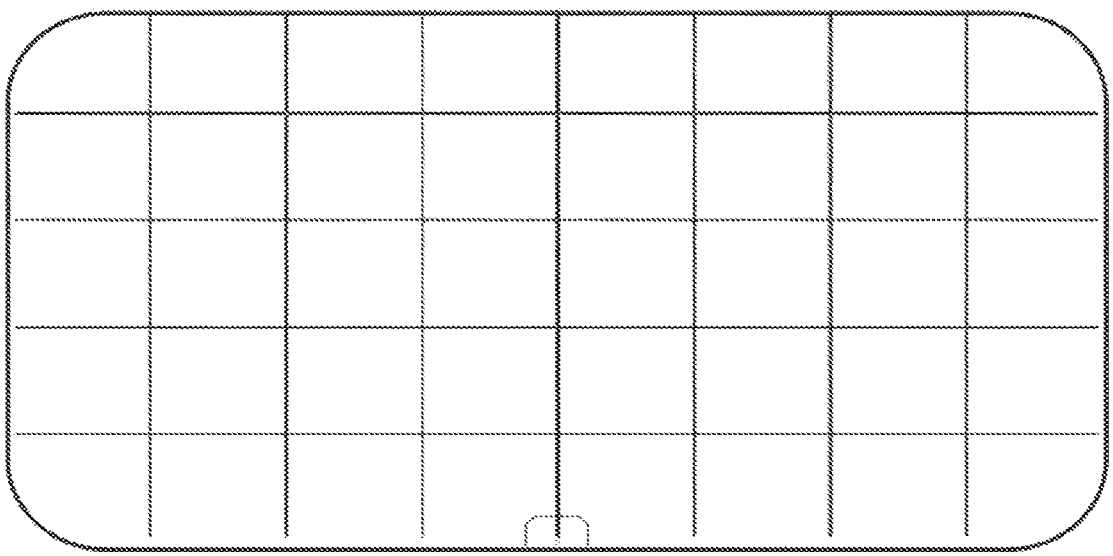
Figure 9:
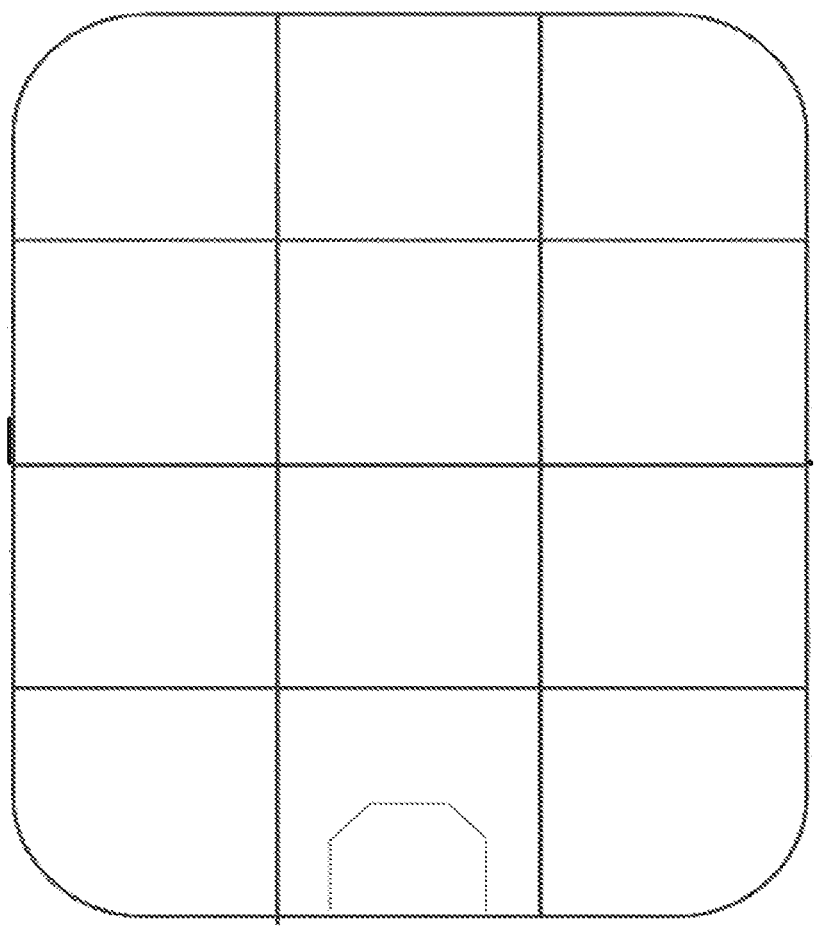

To determine this, the process chamber temperature is gradually increased (1-2° C.) after determining the lower building temperature and the powder bed is closely observed as to whether one of the effects described above occurs. Additionally or alternatively, the upper building temperature may be determined by determining the powder bed hardness by means of a Shore measurement. This may be particularly helpful if one of the effects described above does not yet occur, but the unsintered powder bed is so hard at the end of the building process that exposed components can no longer be separated from the unsintered powder, which severely limits the imaging accuracy of the components. For this purpose, when the observed or assumed upper building temperature is reached, the process chamber temperature is lowered by 1° C. and another 3 mm of powder is applied in layers as a cover layer in automatic building mode. At the end of the building process, the powder cake is cooled to room temperature. The surface of the cooled powder cake is determined in the exchangeable frame in the machine by means of a suitable Shore hardness measuring device (here: Bareiss HPII) on a matrix on the reduced building platform of the P800 (4×5 in xy, FIG. 6), or distributed over the entire building area on the P395 (4×5, FIG. 7) in the middle of the respective sector. The Shore hardness value results as a mean value from the 50% highest measured values of the matrix. If there is a split in the powder bed in the area of the location to be measured (due to the powder cake shrinkage caused by the cooling process to room temperature), the measured value in the respective sector must be detected at a sufficient distance from the split (approx. 15 mm). For larger laser sintering machines like the P770 (see FIG. 8) or P810 (entire building area), the matrix should be extended to 8×5. For smaller laser sintering machines such as the P110, it should be reduced to 3×4 (FIG. 9). For other laser sintering machines with other building chamber sizes, the matrices can be adjusted accordingly so that similarly large sector sizes are obtained. The Shore hardness for the upper building temperature depends in particular on the type of pulverulent material used. How high it is depends on the material in question and on the requirements for component quality and recycling of used powder. Appropriately, the same Shore hardness for the upper building temperature is used as a basis for comparison for a specific composite blend and the associated first powders and second powders. That is, for the first powder, the second powder and blends of second and first powders, it is always substantially the same. Furthermore, no change in the heating distribution of the laser sintering machine should preferably be made between the powders to be compared, as this may have an effect on the determined Shore hardness value.

Which Shore hardness measurement is suitable for which powder may be determined. Shore hardness Shore 00, Shore 000 and Shore 000 S, which are also regulated in ASTM D 2240, have turned out to be preferable.

These and other hardness tests according to Shore are described in the operating manual of the Bareiss HPII (HPE II Shore [D], version 26.05.2017) and the associated standards are listed. As an example, the Shore hardness for the upper building temperature has been determined for some polymer powders using the Bareiss HPII Shore hardness measuring device:

1) PEKK (K6003-2 and PEKK-CF1 and their powder blends from example 1):
   Shore-00=85
2) Polyamide 11 (PA11 d80, HP11-30 from example 5):
   Shore-00=50
3) Polyamide 12 (PA220050/50 mixed powder on P396, default.job:
   PA2200_120_100_Balance, exposure parameter EOS):
   Shore-00=48

These determined values do not represent absolute values for the powder mentioned but are to be determined individually by the user. For other laser sintering systems and other process conditions (e.g. other heating distribution, other heating parameters, other layer thicknesses, other recoating parameters), these values may vary. Likewise, these values may vary depending on the user's requirements for component quality and depending on the refreshment rate.

Processing Temperature

The processing temperature, represented by the process chamber temperature TPC is preferably selected to be at least 1° C., even more preferably at least 2° C. and even more preferably at least 4° C. above the lower building temperature of the powder and/or at most at the upper building temperature, more preferably at most 1° C., even more preferably at most 2° C. and even more preferably at most 4° C. below the upper building temperature. Preferably, the processing temperature is above the lower building temperature and below the upper building temperature of the powder. In this way, there is sufficient process reliability (no curling, due to the greatest possible distance from the NCT) and the highest possible processing temperature is achieved without the pulverulent material sticking together. Preferably, the same processing temperature is selected for all powders to be compared. If this is not possible because the NCT is too high for one powder or the UBT is too low, then a different processing temperature should be selected for this powder. For comparability, the Shore hardness of the powder cake may be used as a guide, which should be essentially the same.

Alternatively or additionally, the processing temperature for each powder may be determined by determining the Shore hardness of the cooled powder cake, according to the procedure described under determination of the maximum building temperature (UBT). The Shore hardness value should preferably be 5% and at most 50% below the Shore hardness value of the UBT. Preferably at most 15% below, especially preferably at most 10% below.

Manufacturing of Components on the Laser-Sintering Machine

Figure 3:
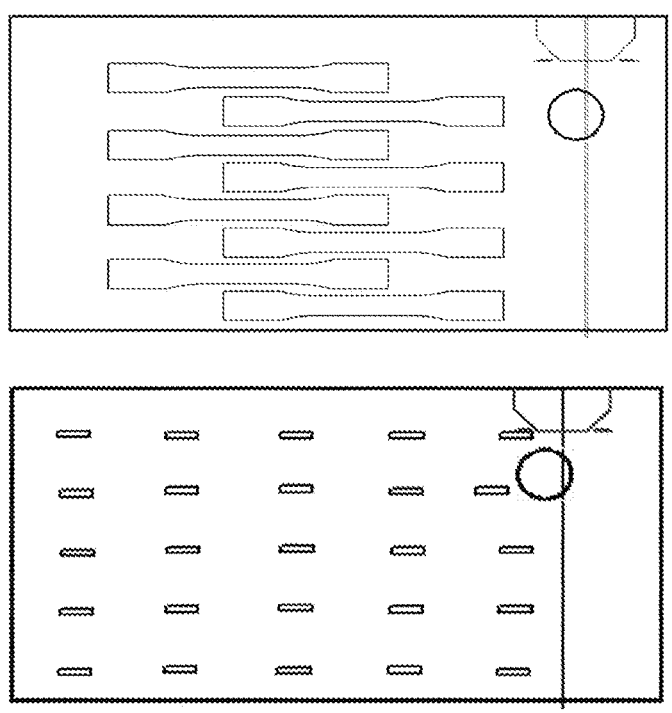
FIG. 3 shows the positions of the tensile specimens and density cubes on the EOS P800 for determining the upper building temperature.

If the thermoplastic material contains or is a polymer of the class of polyaryletherketones (PAEK), especially PEKK, the tests were carried out on a modified P800 (EOS P800 with start-up kit PAEK 3302CF) with PSW3.6.90. After a warm-up phase, during which the process chamber of the laser sintering machine is warmed up from room temperature to the specified building temperature or the start-up temperature of the temperature search within 120 min, 50 layers are applied as a bottom layer without irradiation (=6 mm). After applying the bottom layer, either the 4 to 8 tensile specimens (ASTM D638, positioned next to each other in the centre of the building area, with the parallel length aligned parallel to the x-direction) or a matrix of 5 by 5 squares filling the building area for determining the component density (dimensions: 20 mm×4 mm×13.56 mm, 30 mm distance from the edges) are built at z=6 mm, or the temperature search (as described above) is started. Following the last exposed layer, further 3 millimetres of powder were applied automatically and the machine was cooled down to 180° C. within approx. 8 h by means of a controlled cooling phase, which is defined in the default job, before the heaters were switched off completely. After reaching room temperature, the components were manually unloaded, glass bead blasted and measured/inspected. FIG. 3 shows the positions of the tensile specimens and density cubes on the EOS P800.

The building area size is approximately 350 mm×220 mm (approx. ¼ of the full building platform size; building area reduction variant 1 for P800 in xy direction according to application instructions EOS PEEK-HP3).

The following settings were selected:
Process chamber temperature when building the tensile rods/density cubes 280-290° C.;
temperature of the exchangeable frame/building platform: 265° C.;
Default job settings: PAEK3302CF_120_pre002;
Irradiation parameters: _EOS_increase9 (with a volume energy input hatch: 0.273 Ws/mm³).

Figure 4:
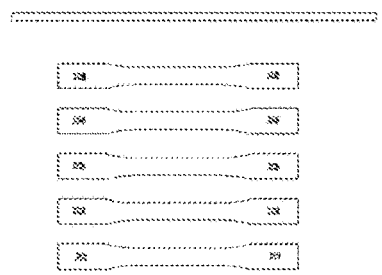
FIG. 4 shows the position of the x-tensile specimens and the tensile plate in the building area of the EOSINT P395.

If the thermoplastic material contains or is a polymer of the polyamide class, in particular PA 11, the tests were carried out on a P395 with PSW 3.6.91.1. After a warm-up phase of 120 min, during which the EOSINT P395 machine was warmed up to the building temperature or the start temperature of the temperature search, 6 mm (=50 layers) without irradiated areas were placed as a bottom layer. In the middle of the building area, 5 tensile specimens were built in x-alignment (see FIG. 4, ASTM D638) as well as a cuboid component at the rear part of the building area to determine the warpage (dimensions 250 mm×6 mm×21 mm). After the last exposed layer, another 3 millimetres of blank layers were automatically applied before the heating was switched off. The building area was then purged with nitrogen gas for a further 10 hours. FIG. 4 shows the position of the x-tensile specimens and the warpage plate in the building area of the EOSINT P395.

Size of the building area: The components were placed in the PSW at a distance of at least 20 mm from the edge of the building area (300 mm×300 mm).

The following settings were selected:
Process chamber temperature during the building of the tensile rods/warpage plates: 184° C.
temperature of the unloading chamber: 160° C.
Default settings:
PA1102Black_120_001 (for PA11-based powder blend/composite).
PA1101_120_003 (for pure PA11 Rilsan D80).
Irradiation parameters:
Specific parameter for tests with PA11-based powder blend with volume energy input hatch: 0.250 Ws/mm³.
_Mechanic (for pure PA11 Rilsan D80)

Determination of Warpage

In order to quantify the warpage of components, a cuboid measuring 250 mm×6 mm×21 mm is built in the rear part of the building chamber (positioning see FIG. 4). The measure of building warpage (warpage during the building process) is the difference in height of the cuboid between the measuring points at the edges and a measuring point in the middle (x=125 mm) of the cuboid in relation to the actual height of the cuboid in the middle in percent, wherein the height of the cuboid in the middle is usually greater than at the edges.

As a measure of the cooling warpage (warpage after the building process, which—in contrast to the building warpage—does not result in missing material), the curvature of the underside of the component is given at x=125 mm (centre of the component), wherein the shape of the curved underside is mathematically approximated with a parabola.

The following applies: $f(x)=ax^2$, with $a=0$ for a non-warped component. The curvature of a graph is defined as $\kappa(x)=((\partial^2 f(x))/\partial x^2)/[(1+(\partial f(x)/\partial x)^2)]^{(3/2)}$. In the middle of the component corresponding to the vertex of the parabola, $\kappa(0)=2a$ thus holds.

Optical Methods for the Determination of Particle Size and Particle Shape

The measurement is carried out on the device Camsizer XT and the module X-Jet (company Retsch Technology GmbH) with the corresponding software CamsizerXT64 (version 6.6.11.1069). The optical methods for the determination of particle size and particle shape are carried out according to the standard ISO 13322-2. After determination of the velocity adjustment, the sample of about 2 g is dispersed with 80 kPa compressed air and passed through a 4 mm wide duct to a calibrated optical unit with two differently magnifying cameras ("Basic" and "Zoom"). At least 10 000 individual images are recorded for evaluation. To ensure a good optical separation of the observed particles, images are only used if the areal density of the imaged particles is less than 3% ("Basic" camera) or less than 5% ("Zoom" camera). The particle sizes and shapes are determined using defined measurement parameters. The determined size is the equivalent diameter of the equal-area circle of the particle projection x_area=√(4A/π). The meridian or mean value of this evaluation method is comparable to the laser diffraction (given as d10, d50 and d90, i.e. as 10% quantile, 50% quantile and 90% quantile of the volumetric particle size distribution). The measurement is repeated several times for obtaining a statistical measurement value.

For powders with a high specific density >2 g/cm3 or powders that are difficult to disperse, it may be necessary to adjust the method with regard to sample quantity, dispersion pressure or the addition of 1% of the anti-caking agent Alu C. The method adjustment is done by varying the sample amount (up to 8 g) and the dispersion pressure (up to 150 kPa) in such a way that the smallest possible d90 is obtained.

Calibration and adjustment of the Camsizer parameters are to be performed instrument specific and adjustment and maintenance are to be performed according to the manufacturer's instructions. An example configuration of the Camsizer XT software depicting various parameter adjustments is illustrated in FIGS. 10 through 12.

Determination of the Density

The density of the manufactured three-dimensional objects is measured according to ISO 1183 on a Kern 770-60 balance with a Satorius density determination set YDK 01. The density can be used to determine the porosity of the object if the theoretical density of the 100% crystalline polymer, the theoretical density of the amorphous polymer and the crystallinity of the manufactured polymer object are known. Alternatively, if the theoretical density values for the polymer are not known, the porosity can be determined by micro computed tomography measurements. A suitable device is e.g. the μ-CT40 from the company SCANCO Medical AG, Brüttisellen, Switzerland.

Determination of Crystallinity

The crystallinity in the manufactured object can be measured by Differential Scanning calorimetry (DSC) according to ISO11357-1. Alternatively, the crystallinity can be determined by measuring the wide angle X-ray scattering (WAXS).

The following examples are for illustrative purposes and are not to be understood as having a limiting effect.

Determination of the Powder Content of the Second Powder in Volume %:

The volume fraction of the second powder (P2) in the whole mixture [second powder (P2)+first powder (P1)] can be calculated from the weight of the powder and the bulk density of the powders using the following formula.

$$\text{volume \% } P2 = \frac{\text{weight}P2[g]}{(\text{weight}P1 + P2)[g]} \times \frac{\text{bulk density}P1\left[\frac{g}{cm^3}\right]}{\text{bulk density}P2\left[\frac{g}{cm^3}\right]} \times 100\%$$

EXAMPLES

In the following examples, contents are given in percent by volume unless otherwise stated.

Example 1

First Powder (PEKK-CF 1—Powder with Reinforcement Material)

Composite powder of 23 wt % carbon fibre filled PEKK copolymer with repeating units 60% terephthaloyl group and 40% isophtaloyl group (HT23; Advanced Laser Materials, Temple, TX, USA). The mean fibre diameter is 7 μm. The fibres are essentially completely coated by the polymer matrix. The powder is characterised by a melt volume-flow rate (MVR) of 46.8 cm³/10 min and $T_{ei,\,m}$ at 268.0° C. The bulk density is 0.54 g/cm³, the particle size distribution is characterised by ($D_{10}/D_{50}/D_{90}$): 45.9 μm/84.2 μm/113.1 μm.

Second powder (K6003-2, -3, -4—powder without reinforcement material) Coarse powder of PEKK copolymer with repeating units 60% terephthaloyl group and 40% isophtaloyl group (Kepstan 6003 PF, Arkema, France) is comminuted by grinding on an impact mill at room temperature and classified to the appropriate particle size using an air-floating classifier. The powder is then treated by thermomechanical treatment at 165° C. for 15 minutes in a commercial high-speed mixer. In a circulating air oven with nitrogen atmosphere (type Nabertherm N250/A) the powder is tempered at 250° C. (K6003-2), 262° C. (K6003-3) or 270° C. (K6003-4) for 3 hours. For this purpose, in each oven batch, 7 kg of the powder are layered in aluminium trays with a maximum height of 4 cm and annealed for 4 hours. The heating time to the annealing temperature is 2 hours. The powder is sieved with a tumbler sieve machine (Perflux 501, sieve disc mesh size: 150 μm, Siebtechnik GmbH, Mühlheim, Germany) to break up or remove agglomerates.

The powders are characterised as shown in Table 1 below.

TABLE 1

Powder characteristics of K6003. MVR: melt volume-flow rate; $T_{ei,\,m}$: extrapolated initial temperature; PSD: particle size distribution.

| Designation | oven temperature [° C.] | MVR [cm³/ 10 min] | $T_{ei,\,m}$ [° C.] | bulk density [g/cm³] | PSD ($D_{10}/D_{50}/D_{90}$) [μm] |
|---|---|---|---|---|---|
| K6003-2 | 250° C. | 75.9 | 256.3 | 0.38 | 34.0/66.5/123.1 |
| K6003-3 | 262° C. | 76.3 | 267.1 | 0.38 | 35.5/64.9/109.8 |
| K6003-4 | 270° C. | 76.3 | 272.6 | 0.38 | 33.8/62.5/100.6 |

Composite Blend Powder (Powder Mixtures)

In a commercial concrete mixer, the first and second powders are dry-mixed for 20 minutes according to the contents given in Table 2 below.

TABLE 2

Powder characteristics of the powder mixtures of Example 1.

| first powder (reinforced) | second powder (not reinforced) | percentage of the second powder | M % CF | MVR [cm³/ 10 min] | $T_{ei,\,m}$ [° C.] | bulk density [g/cm³] | PSD ($D_{10}/D_{50}/D_{90}$) [μm] |
|---|---|---|---|---|---|---|---|
| PEKK-CF 1 | K6003-2 | 10 | 21.4 | 49.6 | 255.8 | 0.54 | 44.3/83.2/114.4 |
| PEKK-CF 1 | K6003-2 | 20 | 19.9 | 50.9 | 255.3 | 0.51 | 42.5/81.5/114.5 |

TABLE 2-continued

Powder characteristics of the powder mixtures of Example 1.

| first powder (reinforced) | second powder (not reinforced) | percentage of the second powder | M % CF | MVR [cm³/ 10 min] | $T_{ei, m}$ [° C.] | bulk density [g/cm³] | PSD ($D_{10}/D_{50}/D_{90}$) [µm] |
|---|---|---|---|---|---|---|---|
| PEKK-CF 1 | K6003-2 | 30 | 18.3 | 53.4 | 256.3 | 0.50 | 41.3/78.7/114.3 |
| PEKK-CF 1 | K6003-3 | 10 | 21.4 | 50.8 | 265.1 | 0.54 | 43.5/82.4/113.5 |
| PEKK-CF 1 | K6003-3 | 20 | 19.8 | 51.2 | 265.7 | 0.52 | 42.3/80.6/112.2 |
| PEKK-CF 1 | K6003-3 | 30 | 18.3 | 54.5 | 265.6 | 0.51 | 41.5/79.6/113.9 |
| PEKK-CF 1 | K6003-4 | 20 | 19.8 | 51.6 | 269.1 | 0.53 | 42.8/80.9/113.3 |
| PEKK-CF 1 | K6003-4 | 30 | 18.3 | 54.1 | 270.2 | 0.51 | 40.6/79.3/111.8 |

Results

The exchangeable frame temperature and the building platform temperature was 265° C. for all examples. The mechanical data and relevant temperatures are summarised in Table 3 below.

TABLE 3

Mechanical data and relevant temperatures for Example 1.

| first powder (reinforced) | second powder (not reinforced) | percentage of the second powder | NCT [° C.] | UBT [° C.] | tensile strength [MPa] | modulus of elasticity [GPa] | elongation at break [%] | $T_{PC}$ [° C.] |
|---|---|---|---|---|---|---|---|---|
| PEKK-CF 1 | — | 0 | 281 | 295 | 92.7 | 6.9 | 1.5 | 285 |
| — | K6003-2 | 100 | 269 | 277 | 68.3 | 4.4 | 1.6 | 277 |
| — | K6003-3 | 100 | 276 | 285 | — | — | — | — |
| — | K6003-4 | 100 | 281 | 289 | — | — | — | — |
| PEKK-CF 1 | K6003-2 | 10 | 265 | 287 | 91.5 | 6.6 | 1.5 | 285 |
| PEKK-CF 1 | K6003-2 | 20 | 265 | 286 | 87.6 | 6.5 | 1.5 | 285 |
| PEKK-CF 1 | K6003-2 | 30 | 265 | 285 | 89.3 | 6.1 | 1.6 | 285 |
| PEKK-CF 1 | K6003-3 | 10 | 273 | 294 | 90.5 | 6.5 | 1.5 | 285 |
| PEKK-CF 1 | K6003-3 | 20 | 270 | 291 | 88.6 | 6.1 | 1.5 | 285 |
| PEKK-CF 1 | K6003-3 | 30 | 270 | 291 | 91.6 | 6.1 | 1.6 | 285 |
| PEKK-CF 1 | K6003-4 | 20 | 276 | 290 | 90.0 | 6.1 | 1.5 | 285 |
| PEKK-CF 1 | K6003-4 | 30 | 276 | 294 | 86.3 | 6.5 | 1.5 | 285 |

NCT: Non-Curl Temperature; UBT: highest possible building temperature; $T_{PC}$: Process Chamber Temperature. "—" means "not determined".

The specified data show that even a small addition of 10% by volume of unreinforced PEKK significantly increases the possible process window (difference between the lowest possible building temperature (non-curl temperature=NCT) and the highest possible building temperature (upper building temperature=UBT)). While the process window for PEKK-CF 1 is 14° C. and for unreinforced PEKK (K6003-2, -3, -4) it is 7-9° C., it increases to values between 14° C. and 21° C. for all mixtures. In particular, the lowest possible building temperature is significantly reduced compared to PEKK-CF 1, which allows the powder mixture to be processed at lower temperatures and thus slows down powder ageing. This results in a smaller change in viscosity and thus a better refreshment factor.

This increase of the process window and thus the process stability is accompanied by an almost constant tensile strength with respect to PEKK-CF 1 and a significant increase of the tensile strength compared to the unreinforced component.

The use of the different unreinforced powders shows that the increase in the process window is not exclusively due to the reduced (K6003-2) extrapolated initial temperature of the melting peak ($T_{ei, m}$) compared to the reinforced powder, as the reduction in NCT can also be observed for unreinforced PEKK variants that have a $T_{ei, m}$ similar to (K6003-3) or higher than (K 6003-4) compared to the reinforced powder (PEKK-CF 1). If $T_{ei, m}$ of the second unreinforced PEKK powder is lower (K6003-2; 256.3° C.) or approximately the same (K6003-3; 267.1° C.) compared to that of the first reinforced powder PEKK-CF1 (268° C.), then the process window of the powder mixture (difference UBT-NCT) is the largest at 21° C., while it is higher at a higher $T_{ei, m}$ (K6003-4; 272.6° C.) is somewhat smaller at about 14° C., but still larger than that of the K6003-4 as the sole component being 8° C.

Example 2

First Powder (PEKK-CF 2)

Composite powder of 27 wt. % carbon fibre-filled PEKK copolymer (with repeating units 60% terephthaloyl group and 40% isophtaloyl group) prepared analogously to HT23 (ALM, Temple, TX, USA). The powder is characterised by an MVR of 14.8 cm³/10 min and $T_{ei, m}$ at 268.2° C. The bulk density is 0.60 g/cm³, the particle size distribution is characterised by ($D_{10}/D_{50}/D_{90}$): 429 µm/85.9 µm/124.5 µm.

Second Powder (K6003-2)

Analogous to Example 1

Composite Blend Powder (Powder Mixtures)

Preparation analogous to Example 1; the mixture conditions and the characterisation of the powder mixtures are specified in Table 4 below.

TABLE 4

Powder characteristics of the powder mixtures of Example 2.

| first powder (reinforced) | second powder (not reinforced) | percentage of the second powder | M % CF | MVR [cm$^3$/ 10 min] | $T_{ei, m}$ [° C.] | bulk density [g/cm$^3$] | PSD ($D_{10}/D_{50}/D_{90}$) [μm] |
|---|---|---|---|---|---|---|---|
| PEKK-CF 2 | K6003-2 | 10 | 25.3 | 17.0 | 254.6 | 0.57 | 42.5/85.7/125.8 |
| PEKK-CF 2 | K6003-2 | 20 | 23.6 | 21.5 | 254.7 | 0.56 | 42.8/84.4/127.9 |
| PEKK-CF 2 | K6003-2 | 24 | 22.9 | 21.1 | 255.5 | 0.53 | 41.8/85.2/126.4 |
| PEKK-CF 2 | K6003-2 | 30 | 21.9 | 21.5 | 255.5 | 0.52 | 41.4/84.7/130.9 |
| PEKK-CF 2 | K6003-2 | 40 | 20.2 | 24.8 | 255.7 | 0.50 | 40.2/81.6/126.6 |
| PEKK-CF 2 | K6003-2 | 50 | 18.5 | 29.7 | 255.7 | 0.48 | 40.3/80.1/125.9 |

Results

The exchangeable frame temperature and the building platform temperature was 265° C. for all examples. The mechanical data and relevant temperatures are summarised in Table 5 below.

TABLE 5

Mechanical data and relevant temperatures for Example 2.

| first powder (reinforced) | second powder (not reinforced) | percentage of the second powder | tensile strength [MPa] | modulus of elasticity [GPa] | elongation at break [%] | $T_{PC}$ [° C.] |
|---|---|---|---|---|---|---|
| PEKK-CF 2 | — | 0 | 87.3 | 6.3 | 1.6 | 286 |
| — | K6003-2 | 100 | 68.3 | 4.4 | 1.6 | 277 |
| PEKK-CF 2 | K6003-2 | 10 | 81.6 | 5.8 | 1.6 | 286 |
| PEKK-CF 2 | K6003-2 | 20 | 83.7 | 5.8 | 1.6 | 286 |
| PEKK-CF 2 | K6003-2 | 24 | 84.9 | 5.9 | 1.6 | 286 |
| PEKK-CF 2 | K6003-2 | 30 | 84.6 | 5.7 | 1.7 | 286 |
| PEKK-CF 2 | K6003-2 | 40 | 79.5 | 5.8 | 1.5 | 286 |
| PEKK-CF 2 | K6003-2 | 50 | 79.0 | 5.3 | 1.6 | 286 |

The data from table 5 show that up to a volume fraction of 30-40% of the unreinforced powder, the tensile strength as well as the modulus of elasticity drop by a comparable value of 2.7%-8.9% (tensile strength) and 6.3%-9.5% (modulus of elasticity), respectively, and are thus still clearly above the mechanical values of the unreinforced powder. The elongation at break of the very brittle material, on the other hand, does not change.

Example 2 involves a mixture with 24% by volume of unreinforced powder. This mixture corresponds to a powder with a carbon fibre content of 23 wt. % corresponding to the reinforced powder of Example 1. This comparison shows that an object with similar properties can be produced from the powder mixture according to the invention as from pure reinforced powder PEKK-CF 1. The general drop in mechanical properties compared to PEKK-CF 1 is due to the lower level of the starting material PEKK-CF 2.

Example 3

First Powder (PEKK-CF 3)

Composite powder of 23 wt. % carbon fibre-filled PEKK copolymer (with repeating units 60% terephthaloyl group and 40% isophtaloyl group) comprising fibres of a mean fibre diameter of 5 μm, prepared analogously to HT23 (ALM, Temple, TX, USA). The powder is characterised by an MVR of 41.8 cm$^3$/10 min and $T_{ei, m}$ at 267.8° C. The bulk density is 0.55 g/cm$^3$, the particle size distribution is characterised by ($D_{10}/D_{50}/D_{90}$): 42.2 μm/87.0 μm/125.0 μm.

Second Powder (K6003-1)

Analogous to Example 1, K6003-2. The powder was tempered at 250° C. for 4 hours, but it has a higher viscosity (MVR=50.1 cm³/10 min) and a $T_{ei,\,m}$ at 245.8° C.

Composite Blend Powder (Powder Mixtures)

Analogous to Example 1; the mixture conditions and the characterisation of the powder mixtures are specified in Table 6 below.

TABLE 6

Powder characteristics of the powder mixtures of Example 3.

| first powder (reinforced) | second powder (not reinforced) | percentage of the second powder | M % CF | MVR [cm³/ 10 min] | $T_{ei,\,m}$ [° C.] | bulk density [g/cm³] | PSD ($D_{10}/D_{50}/D_{90}$) [µm] |
|---|---|---|---|---|---|---|---|
| PEKK-CF 3 | K6003-1 | 10 | 21.5 | 41.5 | 245.1 | 0.54 | 40.3/85.0/120.6 |
| PEKK-CF 3 | K6003-1 | 20 | 20.0 | 43.4 | 244.2 | 0.52 | 38.6/82.1/120.6 |
| PEKK-CF 3 | K6003-1 | 30 | 18.5 | 45.5 | 245.3 | 0.50 | 34.6/77.6/120.2 |

Results

The results are shown in Table 7.

TABLE 7

Mechanical data and relevant temperatures for Example 3.

| first powder (reinforced) | second powder (not reinforced) | percentage of the second powder | NCT [° C.] | tensile strength [MPa] | modulus of elasticity [GPa] | elongation at break [%] | $T_{PC}$ [° C.] |
|---|---|---|---|---|---|---|---|
| PEKK-CF 3 | — | 0 | 290 | 75.3 | 7.5 | — | 290 |
| — | K6003-1 | 100 | 276 | 70-75 | 4.0 | — | 281 |
| PEKK-CF 3 | K6003-1 | 10 | 284 | 67.4 | 6.8 | 1.0 | 286 |
| PEKK-CF 3 | K6003-1 | 20 | 277 | 69.6 | 6.7 | 1.1 | 286 |
| PEKK-CF 3 | K6003-1 | 30 | 274 | 77.4 | 6.9 | 1.0 | 286 |

The results show that the process-stabilising effect of the powder mixture occurs independently of the fibre diameter of the carbon fibres used in the reinforced powder. Also in this example, the tensile strength drops only slightly compared to the pure first powder (reinforced), the NCT of the powder mixture, on the other hand, can even be reduced below the respective NCT of the two individual components at a content of the second powder (unreinforced) of 30 vol. %. Due to the therefore lower possible building temperature, a more process-stable building is possible. Furthermore, the recyclability of the powder is improved, as the ageing of the powder is slowed down at lower temperatures.

Example 4

First Powder (PEKK-CF 2)
Analogous to Example 2.
Second Powder (K6003-1)
Analogous to Example 3.
Composite Blend Powder (Powder Mixtures)
Analogous to Example 1. The mixture consists of 76% of the first powder component PEKK-CF 2 and 24% of the second, not reinforced powder component K6003-1. The bulk density is at 0.54 g/cm³, the particle size distribution is characterised by ($D_{10}/D_{50}/D_{90}$): 39.7 µm/86.1 µm/127.2 µm.

Results

Figure 5:
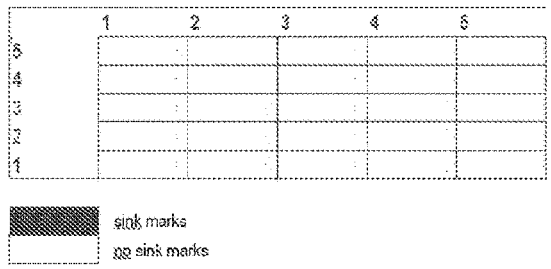
FIG. 5 shows a comparison of the sink marks as a measure of powder ageing for an object manufactured from pure reinforced powder (right) and an object manufactured from the powder mixture according to the invention (left).
Figure 5:
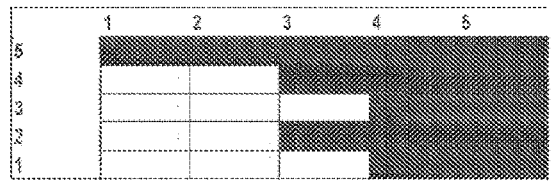

Both building jobs took place at a process chamber temperature of 286° C. and an exchangeable frame or building platform temperature of 260° C. 25 solid cuboids with the dimensions 20 mm×4 mm×13.56 mm are built distributed over the reduced building area of the EOS P800. The results are shown in FIG. 5. While 15 of the 25 cuboids built with the pure, reinforced powder PEKK-CF 2 (right) show sink marks, the cuboids built with the powder mixture according to the invention with 24 vol. % K6003-1 (left) show no sink marks. This example illustrates the slowed powder ageing of the powder mixture according to the invention. The tests indicate that better refreshing is possible.

Example 5

First Powder (HP11-30)

Composite powder of 30 wt. % carbon fibre-filled polyamide 11 (HP11-30; Advanced Laser Materials, Temple, TX, USA). The mean fibre diameter is 7 µm. The fibres are essentially entirely coated by the polymer matrix.

Second Powder (PA11 D80)

Polyamide 11 powder (Rilsan d80, Arkema, France).

Composite Blend Powder (Powder Mixtures)

In a commercial concrete mixer, the first and second powder components are dry-mixed for 20 minutes according to the contents given in Table 8.

TABLE 8

Powder characteristics of the powder mixtures of Example 5.

| first powder (reinforced) | second powder (not reinforced) | percentage of the second powder M % CF | MVR [cm³/10 min] | $T_{ei,m}$ [° C.] | bulk density [g/cm³] | PSD ($D_{10}/D_{50}/D_{90}$) [μm] |
|---|---|---|---|---|---|---|
| HP11-30 | — | 0 30.0 | 80.9 | 166.9 | 0.41 | 40.4/80.4/118.8 |
| — | PA11 D80 | 100 0.0 | 52.6 | 177.5 | 0.48 | 58.5/104.3/156.3 |
| HP11-30 | PA11 D80 | 10 26.6 | 76.4 | 167.4 | 0.42 | 41.0/80.8/118.7 |
| HP11-30 | PA11 D80 | 20 23.2 | 63.7 | 170.5 | 0.42 | 41.6/84.9/134.3 |
| HP11-30 | PA11 D80 | 30 20.0 | 57.1 | 169.0 | 0.42 | 44.4/87.2/139.8 |
| HP11-30 | PA11 D80 | 50 13.8 | 42.2 | 177.8 | 0.43 | 48.0/90.0/143.3 |

Results

The process chamber temperature was 184° C. for all experiments, the temperature of the unloading chamber was 160° C. The results are summarised in Table 9.

TABLE 9

Mechanical data and relevant temperatures.

| first powder (reinforced) | second powder (not reinforced) | percentage of the second powder | NCT [° C.] | UBT [° C.] | tensile strength [MPa] | modulus of elasticity [GPa] | elongation at break [%] |
|---|---|---|---|---|---|---|---|
| HP11-30 | — | 0 | 182 | 185 | 56.3 | 2.7 | 9.6 |
| — | PA11 D80 | 100 | 179 | 188 | 52.1 | 1.5 | 41.0 |
| HP11-30 | PA11 D80 | 10 | 177 | 185 | 56.9 | 2.6 | 15.4 |
| HP11-30 | PA11 D80 | 20 | 176 | 185 | 56.4 | 2.5 | 16.8 |
| HP11-30 | PA11 D80 | 30 | 176 | 185 | 56.2 | 2.4 | 18.0 |
| HP11-30 | PA11 D80 | 50 | 176 | 185 | 54.6 | 2.1 | 34.2 |

In this example, a polyamide-11 was used as the base material that contains 30 wt. % carbon fibres in the reinforced variant. Comparable to Example 3, it can also be observed here that the NCT can be lowered below the respective NCT of the individual powders when adding unreinforced PA11 (PA11 D80), while maintaining approximately the same upper building temperature (UBT). This lowering of the NCT extends the process window by 5-6° C. and enables a more process-stable building process. Up to a content of 30% by volume of the unreinforced powder, the tensile strength of the manufactured test specimens remains approximately the same as that of the pure reinforced powder (HP11-30). The modulus of elasticity is only slightly reduced in this range by 3.7%-11.1% and still remains approx. 60% above the modulus of elasticity of the pure unreinforced powder (PA11 D80). With similar mechanical properties, the elongation at break in the range up to 30% by volume of the unreinforced powder is about 60%-88% above the elongation at break of the pure reinforced powder. Thus, the components exhibit significantly higher toughness than the pure reinforced powder (HP11-30).

Table 10 lists values for building and cooling warpage.

TABLE 10

Cooling and building warpage in Example 5.

| first powder (reinforced) | second powder (not reinforced) | percentage of the second powder | warpage [curvature = κ] | building warpage [%] |
|---|---|---|---|---|
| HP11-30 | — | 0 | 2.96 | 8.8 |
| — | PA11 D80 | 100 | | |
| HP11-30 | PA11 D80 | 10 | 1.50 | 2.8 |
| HP11-30 | PA11 D80 | 20 | 1.22 | 1.7 |
| HP11-30 | PA11 D80 | 30 | 1.06 | 0.6 |
| HP11-30 | PA11 D80 | 50 | 0.18 | 0.5 |

This illustrates that pure HP11-30 exhibits significant warpage, which, however, decreases significantly with increasing content of PA11 D80 without significantly reducing tensile strength and modulus of elasticity. In particular, high building warpage leads to very unstable building processes, as exposed components can be pulled out by the recoating unit during powder application, similar to curl. It is striking how strongly the so-called cooling warpage (column 4, warpage [K]) is reduced.

Laser-sintered components are often characterised by high crystallinity, which leads to comparatively brittle components with low elongation at break (compared to components from injection moulding). It can be seen that the elongation at break improves considerably compared to components made from the pure reinforced component even with a small admixture of unreinforced powder, but the resistance to fracture remains more or less the same. This means that the relationship between modulus of elasticity and elongation at break can be adjusted to suit the specific application.

In summary, Example 5 shows that the powder mixture according to the invention can be used to produce an object that may exhibit a higher elongation at break and thus a higher ductility with comparable tensile strength and only a slightly reduced modulus of elasticity. At the same time, the powder mixture exhibits a significantly reduced tendency to warp and, together with the reduced lower building temperature, a substantially higher process stability.

It follows from examples 1 to 5 that the powder mixture according to the invention can be used to manufacture objects whose mechanical properties drop only slightly compared to objects made of pure reinforced powder (pure composite), and in some cases even have a higher elongation at break, but the building process can be carried out at lower temperatures and with increased process stability.

Another advantage of composite blend powders is an improvement in the refreshment factor compared to pure composite powders: Fibre-reinforced composite powders in which the filler is present in the powder grain due to the manufacturing process (produced by e.g. melt compounding with grinding, melt spraying, precipitation from solvent) have the advantage that there is a significantly reduced preferential direction of the fibres in the recoating direction during the recoating process. This results in components with significantly more isotropic component properties (especially in the modulus of elasticity) in the xyz direction than is the case with dry blends of fibre and thermoplastic powder. The disadvantage of fibre-in-grain composites, however, is that the melt viscosity and surface tension of the powder grain is significantly higher, resulting in a qualitatively poorer and rougher melt film when melted by the irradiation unit. Dry mixing the composite powder with an unreinforced PEKK, which preferably has a lower melt viscosity than the PEKK-CF (higher MVR value), results in improved melt film formation. This, together with the possibility to build at lower temperatures, leads to an improvement of the refreshment factor of the composite blend compared to the pure composite and to an improved economic efficiency. This is shown by example 4 of a PEKK with 27% carbon fibre content. While components (density cubes) of the pure composite show PEKK sink marks, the components of the composite blend powder with 24% PEKK content show no sink marks.

Furthermore, the reduced crystallisation tendency of the composite blend powder may lead to a reduced warpage of the built objects. As a result, the composite blend can be used at a lower exchangeable frame temperature and/or process chamber temperature than the pure composite. This leads to a reduced ageing of the powder in the process and to an improved refreshment rate.

The invention claimed is:

1. A powder mixture for use as a building material for manufacturing a three-dimensional object by solidifying the building material layer by layer at positions corresponding to a cross-section of the three-dimensional object in a respective layer by exposure to radiation, wherein the powder mixture comprises:
   a first powder comprising powder particles of a first thermoplastic polymer material and a reinforcement material, wherein the reinforcement material is at least partially embedded in the powder particles of the first powder and/or adhered to a surface of the powder particles of the first powder, the first powder comprising 50-90% of a total volume of the powder mixture; and
   a second powder comprising powder particles of a second thermoplastic polymer material which is the same as or different from the first thermoplastic polymer material and excluding the reinforcement material, the second powder comprising 10-50% of the total volume of the powder mixture,
   wherein the reinforcement material is particulate, platelet-like and/or fibrous;
   wherein the reinforcement material is selected from the group consisting of:
   (a) the reinforcement material comprises or consists of fibers, wherein the fibers are selected from the group consisting of carbon fibers, organic fibers, inorganic fibers, and combinations thereof;
   (b) the reinforcement material comprises or consists of nanotubes;
   (c) the reinforcement material comprises or consists of graphite nanoplatelets and/or fullerenes;
   (d) the reinforcement material comprises or consists of platelet-shaped reinforcement materials;
   (e) the reinforcement material comprises or consists of spherical fillers or irregularly shaped low aspect ratio fillers, selected from inorganic and mineral fillers, ceramic particles, aluminium oxide, zirconium oxide, silicon dioxide, zirconium (IV) oxide, titanium (IV) oxide, aluminium titanate, barium titanate, silicon carbide (SiC) and boron carbide (B4C), metals, dye pigments, carbon black, and organic fillers; and
   (f) the reinforcement material comprises or consists of flame retardants; and wherein the powder mixture has a bulk density of 0.35 to 0.70 $g/cm^3$.

2. The powder mixture according to claim 1,
   wherein the powder mixture includes a lowest possible building temperature in a predefined process for manufacturing the three-dimensional object by solidifying the building material layer by layer at the positions corresponding to the cross-section of the three-dimensional object in the respective layer by exposure to the radiation, the lowest possible building temperature of the powder mixture being lower than a lowest possible building temperature of the first powder alone.

3. The powder mixture according to claim 1,
   wherein the powder mixture includes a process window which is equal to or larger than the process window of the first powder alone,
   wherein the process window is defined as a difference between a highest possible building temperature and a lowest possible building temperature in a predefined process for manufacturing the three-dimensional object by solidifying the building material layer by layer at the positions corresponding to the cross-section of the three-dimensional object in the respective layer by exposure to the radiation.

4. The powder mixture according to claim 1,
wherein the thermoplastic polymer material of the first powder and/or the thermoplastic polymer material of the second powder is a polymer material selected from the group consisting of homopolymers, copolymers and polyblends; and
wherein the thermoplastic polymer material of the first powder and/or the thermoplastic polymer material of the second powder comprises a polymer selected from the group consisting of polyetherimides, polycarbonates, polyarylene sulfides, polyarylether sulfones, polyphenylene oxides, polyether sulfones, acrylonitrile-butadiene-styrene copolymers, acrylonitrile-styrene-acrylate copolymers (ASA), polyvinyl chloride, polyacrylates, polyesters, polyamides, polyaryletherketones, polyethers, polyurethanes, polyimides, polyamideimides, polysiloxanes, polyolefins and copolymers which have at least two different repeating units of the aforementioned polymers, as well as polymer blends thereof.

5. The powder mixture according to claim 1,
wherein the reinforcement material is substantially completely embedded in a grain of the powder particles of the first powder.

6. The powder mixture according to claim 1,
wherein a mean particle size $d_{50}$ of the powder particles of the first and/or the second powder is at least 20 µm and at most 150 µm.

7. The powder mixture according to claim 1, having at least one of the properties (i) to (iv):
(i) the bulk density is 0.4 to 0.65 g/cm$^3$;
(ii) a BET surface is less than 10 m$^2$/g;
(iii) an MVR value of the second powder is 0.1 to 10 times an MVR value of the first powder; and
(iv) a melting point and/or an extrapolated initial temperature of the second powder is lower or higher by at most 30° C.

8. A method for enhancing a refreshment rate, or for improving a warpage, and/or for improving mechanical properties of a three-dimensional object, the method comprising:
providing, as a building material, the powder mixture according to claim 1,
solidifying the building material layer by layer at positions corresponding to a cross-section of the three-dimensional object in a respective layer,
wherein at least one of the following modifications (i) to (viii) are obtained in the three-dimensional object:
(i) compared to an object manufactured using only the second powder as the building material, a modulus of elasticity is higher;
(ii) compared to an object which has been manufactured only from the first powder as the building material, a modulus of elasticity is lower by at most 25%;
(iii) compared to an object manufactured only from the first powder as the building material, a refreshment factor is higher;
(iv) compared to an object manufactured only from the first powder as the building material, a preferential direction of the reinforcement material is lower and/or an isotropy in an xyz-direction is higher;
(v) compared to an object manufactured using only the first powder as the building material, a porosity is lower;
(vi) compared to an object manufactured only from the second powder as the building material, an ultimate tensile strength is higher;
(vii) compared to an object manufactured only from the first powder as the building material, the ultimate tensile strength is lower by at most 15%;
(viii) compared to an object manufactured only from the first powder as the building material, an elongation at break is higher.

9. The powder mixture according to claim 4, wherein the thermoplastic polymer material of the first powder and/or the thermoplastic polymer material of the second powder comprises a polyetherketoneketone (PEKK), a polyamide 11 (PA 11), a polyamide 12 (PA 12) or a polyamide 6 (PA 6).

10. A method of preparing a powder mixture for use as building material for manufacturing a three-dimensional object by solidifying the building material layer by layer at positions corresponding to a cross-section of the three-dimensional object in a respective layer,
wherein the first powder and the second powder are as defined as in claim 1 and are mixed together in a desired mixing ratio by dry mixing.

11. A method of preparing a powder mixture according to claim 10, wherein the first powder and/or the second powder is/are produced according to any of the methods (i) to (vii):
(i) by grinding;
(ii) by melt spraying;
(iii) by precipitation from solvents;
(iv) by melt compounding and melt dispersion;
(v) by melt compounding and by fiber spinning and fiber cutting, wherein after spinning, the fibers are stretched to increase a crystalline amount;
(vi) by coating the polymer onto the filler, or coating the filler onto the polymer by a mechanical or thermomechanical treatment; or
(vii) by coating the polymer onto the filler, or the filler onto the polymer by spray coating with solvent or spray drying.

\* \* \* \* \*